United States Patent
Asakawa et al.

(10) Patent No.: US 11,577,538 B2
(45) Date of Patent: Feb. 14, 2023

(54) INK JET RECORDING METHOD AND INK JET RECORDING APPARATUS

(71) Applicant: Seiko Epson Corporation, Tokyo (JP)

(72) Inventors: Yuta Asakawa, Azumino (JP); Akira Mizutani, Matsumoto (JP)

(73) Assignee: SEIKO EPSON CORPORATION

( * ) Notice: Subject to any disclaimer, the term of this patent is extended or adjusted under 35 U.S.C. 154(b) by 240 days.

(21) Appl. No.: 17/116,234

(22) Filed: Dec. 9, 2020

(65) Prior Publication Data

US 2021/0170779 A1   Jun. 10, 2021

(30) Foreign Application Priority Data

Dec. 10, 2019  (JP) .............................. JP2019-222733
Mar. 13, 2020  (JP) .............................. JP2020-044093

(51) Int. Cl.
B41M 7/00     (2006.01)
C09D 11/54    (2014.01)
(Continued)

(52) U.S. Cl.
CPC .......... B41M 7/0018 (2013.01); B41J 11/002 (2013.01); B41M 5/0023 (2013.01);
(Continued)

(58) Field of Classification Search
CPC ............... B41M 5/5227; B41M 5/0011; B41J 11/0022; B41J 2/01; B41J 2/2114; C09D 11/30
See application file for complete search history.

(56) References Cited

U.S. PATENT DOCUMENTS 6,102,537 A  *  8/2000  Kato ................... B41J 2/17513
                                               347/101
8,083,339 B2 *  12/2011  Furukawa .............. C09D 11/30
                                               347/100
(Continued)

FOREIGN PATENT DOCUMENTS

CN           1933978 A        3/2007
CN         110358365 A       10/2019
(Continued)

*Primary Examiner* — John Zimmermann
(74) *Attorney, Agent, or Firm* — Harness, Dickey & Pierce, P.L.C.

(57) ABSTRACT

An ink jet recording method includes a treatment liquid attachment step, in which a treatment liquid is attached to a recording medium, and an ink attachment step, in which a water-based ink composition is attached to the recording medium. An ink jet recording apparatus includes a recording medium support and a heating mechanism that heats the recording medium support. The ink attachment step is carried out with the recording medium supported and heated by the recording medium support. In the ink attachment step, the recording medium is heated so that a surface thereof reaches a maximum temperature of 28.0° C. or more and 45.0° C. or less. The ratio between absorbances A and B (A/B) is 0.5 or more and 0.95 or less, where absorbance A is that of a 0.1% by mass mixture of the water-based ink composition in the treatment liquid, and absorbance B is that of a 0.1% by mass mixture of the water-based ink composition in purified water. The recording medium support has a flat support surface for supporting the recording medium.

16 Claims, 5 Drawing Sheets

(51) Int. Cl.
*B41M 5/00* (2006.01)
*C09D 11/033* (2014.01)
*B41J 11/00* (2006.01)
*C09D 11/30* (2014.01)

(52) U.S. Cl.
CPC ............ *C09D 11/033* (2013.01); *C09D 11/30* (2013.01); *C09D 11/54* (2013.01)

(56) References Cited

U.S. PATENT DOCUMENTS

| | | | |
|---|---|---|---|
| 9,873,814 B2 * | 1/2018 | Kagata | C09D 133/08 |
| 10,639,915 B2 * | 5/2020 | Wakita | B41J 15/046 |
| 2002/0069789 A1 * | 6/2002 | Katsuragi | B41M 5/0017 |
| | | | 106/31.86 |
| 2006/0284929 A1 * | 12/2006 | Matsuzawa | B41M 5/0011 |
| | | | 347/43 |
| 2014/0015895 A1 * | 1/2014 | Okamura | C09D 11/322 |
| | | | 347/100 |
| 2018/0362789 A1 * | 12/2018 | Kiyoto | C08K 3/08 |
| 2019/0126640 A1 | 5/2019 | Tojino et al. | |
| 2019/0291473 A1 | 9/2019 | Okuda et al. | |

FOREIGN PATENT DOCUMENTS

| | | |
|---|---|---|
| JP | 2016-069854 A | 5/2016 |
| JP | 2019-081351 A | 5/2019 |

* cited by examiner

INK JET RECORDING METHOD AND INK JET RECORDING APPARATUS

The present application is based on, and claims priority from JP Application Serial Number 2019-222733, filed Dec. 10, 2019 and JP Application Serial Number 2020-044093, filed Mar. 13, 2020, the disclosures of which are hereby incorporated by reference herein in their entirety.

BACKGROUND

1. Technical Field

The present disclosure relates to an ink jet recording method and an ink jet recording apparatus.

2. Related Art

Ink jet recording, a known technology in which tiny droplets of ink(s) are ejected from nozzles of an ink jet head of an ink jet recording apparatus to record an image on a recording medium, is under study for use in the fields of sign printing and high-speed label printing. When ink jet recording is applied to record an image on a recording medium that absorbs little ink (e.g., art paper or coated paper) or no ink (e.g., plastic film), a class of inks that can be used is water-based resin ink compositions, which are water-based ink compositions containing resin emulsion (hereinafter also simply referred to as "water-based ink compositions" or "water-based inks"). Their advantages include friendliness to the global environment, safety to humans, etc.

Attempts have been made to improve image quality in recording with water-based ink compositions. An example is to use a reaction solution that causes component(s) of the water-based ink composition to aggregate and thereby to accelerate the fixation of the ink composition (for example, see JP-A-2019-081351).

Ink jet recording, moreover, has been making rapid progress in various fields as a technology by which high-definition images can be recorded with relatively simple equipment. In the course of this, researchers have explored how an image can be recorded not only on paper or other smooth recording media but also rough ones. An example of a rough recording medium is fleece paper having a decorative layer on its surface (for example, see JP-A-2016-69854). JP-A-2016-69854 discloses a method for forming a raised pattern, for example, on the surface of fleece paper.

The inventor, however, has found that some water-based ink compositions can react with a reaction solution too vigorously. Such a water-based ink composition can fail to eject properly when mist of the reaction solution reaches the nozzles of the ink jet head or the recording medium comes into contact with the nozzles. The resulting recordings also tend to be low in terms of abrasion resistance and perceived gloss.

Simply reducing the reactivity of the water-based ink composition is not enough. Forming a single-color image with such an ink composition causes the defect of in-plane color differences, i.e., color irregularities from area to area on the recording medium. In-plane color differences need to be reduced while ensuring quick recovery of clogged nozzles.

Attaching a water-based ink to a synthetic fiber-containing sheet having a raised pattern, moreover, often results in unsatisfactory image quality. Such a recording medium having an irregular surface is also difficult to coat evenly with such an ink.

SUMMARY

A first aspect of the present disclosure can be as follows.

(1) A form of an ink jet recording method according to this aspect of the disclosure is an ink jet recording method performed using an ink jet recording apparatus. The method includes a treatment liquid attachment step, in which a treatment liquid containing a flocculant is attached to a recording medium, and an ink attachment step, in which a water-based ink composition containing a colorant is ejected from an ink jet head and attached to the recording medium. The ink jet recording apparatus includes a recording medium support, which supports the recording medium, and a heating mechanism that heats the recording medium support. The ink attachment step is carried out with the recording medium supported and heated by the recording medium support. In the ink attachment step, the recording medium is heated so that a surface thereof reaches a maximum temperature of 28.0° C. or more and 45.0° C. or less where the recording medium is supported by the recording medium support and faces the ink jet head. A ratio A/B between absorbances A and B is 0.5 or more and 0.95 or less, where absorbance A is an absorbance of a 0.1% by mass mixture of the water-based ink composition in the treatment liquid at a peak wavelength, and absorbance B is an absorbance of a 0.1% by mass mixture of the water-based ink composition in purified water at the same wavelength. The recording medium support has a flat support surface for supporting the recording medium.

(2) In form (1) above, the ink attachment step may be by making a plurality of main scans and sub-scans over the recording medium.

(3) In form (1) or (2) above, in the ink attachment step, in-plane variations in a surface temperature of the recording medium may be 8.0° C. or less where the recording medium is supported by the recording medium support and facing the ink jet head.

(4) In any of forms (1) to (3) above, the heating mechanism may heat the recording medium support from a side opposite the support surface of the recording medium support.

(5) In any of forms (1) to (4) above, the colorant in the water-based ink composition may have an average zeta potential of −65.0 mV or more and −50.0 mV or less.

(6) In any of forms (1) to (5) above, the recording medium may measure 0.5 m or more in a direction perpendicular to a direction of transport thereof.

(7) In any of forms (1) to (6) above, the recording medium support may measure longer than the recording medium in a direction perpendicular to a direction of transport of the recording medium.

(8) In any of forms (1) to (7) above, the support surface of the recording medium support may be formed by an element having a thickness of 2.0 mm or more and 10.0 mm or less.

(9) In any of forms (1) to (8) above, the ink attachment step may include an air-blow step, in which air is blown using an air-blow mechanism against the recording medium having the attached water-based ink composition thereon.

(10) In form (9) above, the air may be blown against the recording medium at a velocity of 1.0 m/sec or more.

(11) In form (9) or (10) above, the air blown against the recording medium may have a temperature of 45.0° C. or less.

(12) In any of forms (1) to (11) above, the ratio A/B may be 0.7 or more and 0.9 or less.

(13) In any of forms (1) to (12) above, the recording medium may have a thickness of 40.0 µm or more.

(14) In any of forms (1) to (13) above, a percentage of organic solvents having a normal boiling point exceeding 280.0° C. in the water-based ink composition may be not more than 1.0% by mass.

(15) In any of forms (1) to (14) above, the support surface may touch the recording medium in 90.0% or more by area of a portion thereof where the support surface supports the recording medium and faces the ink jet head.

(16) A form of a recording apparatus according to this aspect of the disclosure is configured to perform the ink jet recording method according to any of forms (1) to (15) above.

(17) A form of an ink jet recording method according to this aspect of the disclosure is an ink jet recording method performed using an ink jet recording apparatus. The method includes a treatment liquid attachment step, in which a treatment liquid containing a flocculant is attached to a recording medium, and an ink attachment step, in which a water-based ink composition containing a colorant is ejected from an ink jet head and attached to the recording medium. The ink jet recording apparatus includes a recording medium support, which supports the recording medium, and a heating mechanism that heats the recording medium support. The ink attachment step is performed with the recording medium heated and supported by the recording medium support. The recording medium support has a flat support surface for supporting the recording medium. A ratio A/B between absorbances A and B is 0.5 or more and 0.95 or less, where absorbance A is an absorbance of a 0.1% by mass mixture of the water-based ink composition in the treatment liquid at a peak wavelength within a range of 380.0 nm to 680 nm, and absorbance B is an absorbance of a 0.1% by mass mixture of the water-based ink composition in purified water at the same wavelength. In the ink attachment step, the recording medium is heated so that a surface thereof reaches a maximum temperature of 28.0° C. or more and 45.0° C. or less where the recording medium is supported by the recording medium support and faces the ink jet head.

A second aspect of the present disclosure can be as follows.

(1) A recording method for recording on a recording medium that is a synthetic fiber-containing sheet having a raised pattern on a surface thereof, the method including an ink attachment step, in which a water-based ink composition is ejected from an ink jet head and attached to the recording medium, wherein the water-based ink composition contains a pigment, water, and at least one organic solvent, the pigment represents 5.0% by mass or less of a total amount of the water-based ink composition, the organic solvent includes at least one solvent selected from glycol ethers and C5 or longer alkanediols, and a total percentage of glycol ethers and C5 or longer alkanediols is 1.0% by mass or more of the total amount of the water-based ink composition.

(2) The recording method according to (1), wherein in the ink attachment step, a maximum amount of attached water-based ink composition is 20 mg/inch² or less.

(3) The recording method according to (1) or (2), wherein the synthetic fiber-containing sheet has a grammage of 100 g/m² or more.

(4) The recording method according to any one of (1) to (3), further including a treatment liquid attachment step, in which a treatment liquid containing a flocculant is attached to the recording medium.

(5) The recording method according to (4), wherein in a region, of the recording medium, that retains a largest amount of attached water-based ink composition among regions to which the water-based ink composition and the treatment liquid are attached, an amount of attached treatment liquid is 20% by mass or less of the amount of attached water-based ink composition.

(6) The recording method according to any one of (1) to (5), further including a clear ink attachment step, in which a clear ink composition is attached to the recording medium.

(7) The recording method according to (6), wherein the clear ink composition contains at least one resin, and the resin includes an acrylic resin, urethane resin, or polyester resin.

(8) The recording method according to any one of (1) to (7), wherein the synthetic fiber-containing sheet is of a nonwoven fabric that contains synthetic and natural fibers.

(9) The recording method according to any one of (1) to (8), wherein the pigment represents 0.5% to 5.0% by mass of the total amount of the water-based ink composition.

(10) The recording method according to any one of (1) to (9), wherein the total percentage of glycol ethers and C5 or longer alkanediols is from 1.0% to 15% by mass of the total amount of the water-based ink composition.

(11) The recording method according to any one of (1) to (10), wherein the organic solvent includes an organic solvent having a normal boiling point of 160° C. to 280° C.

(12) The recording method according to any one of (1) to (11), wherein the water-based ink composition contains resin particles, and the resin particles are of an acrylic resin, urethane resin, or polyester resin.

(13) The recording method according to any one of (1) to (12), wherein in the ink attachment step, multiple main scans are made, a main scan including moving the ink jet head in a main scanning direction that crosses a sub-scanning direction, which is a direction of transport of the recording medium, and ejecting the water-based ink composition to adhere to the recording medium, and two or more of the main scans are made over the same region of the recording medium.

(14) A recording apparatus configured to perform recording by the recording method according to any one of (1) to (13), the apparatus including an ink jet head that ejects a water-based ink composition onto a recording medium that includes a synthetic fiber-containing sheet having a raised pattern on a surface thereof, wherein the water-based ink composition contains a pigment, water, and at least one organic solvent, the pigment represents 5.0% by mass or less of a total amount of the water-based ink composition, the organic solvent includes at least one of glycol ethers and C5 or longer alkanediols, and a total percentage of glycol ethers and C5 or longer alkanediols is 1.0% by mass or more of the total amount of the water-based ink composition.

DESCRIPTION OF EXEMPLARY EMBODIMENTS

Figure 1:
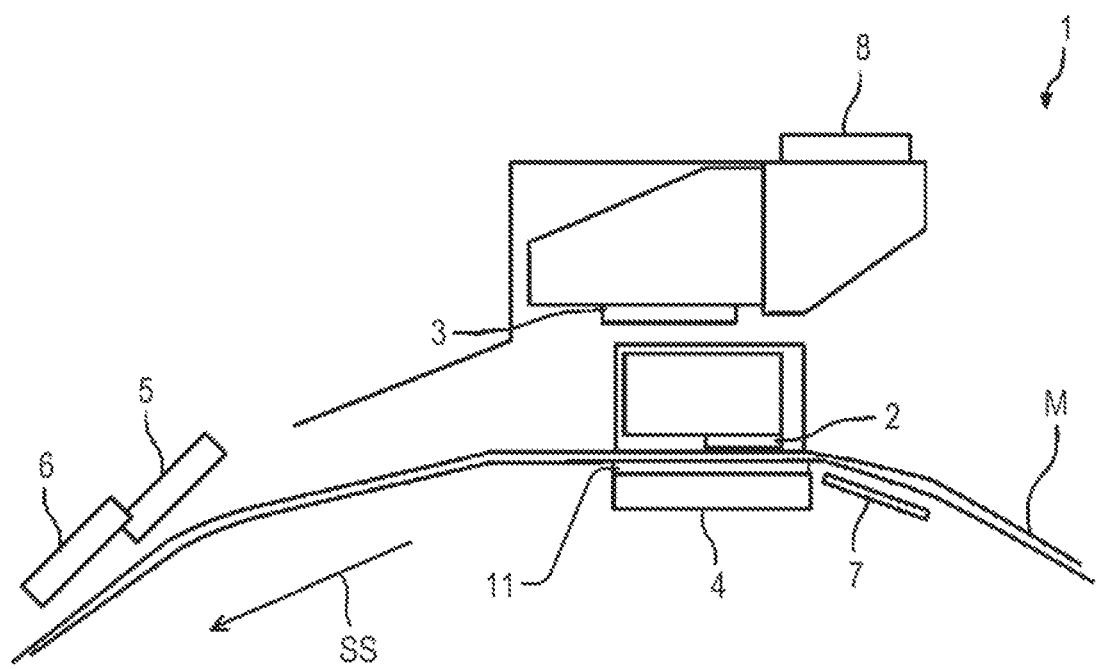
FIG. 1 is an outline illustration of an example of an ink jet recording apparatus according to an embodiment.

The following describes embodiments of a first aspect of the present disclosure. The following embodiments are descriptions of examples of this aspect of the disclosure. The first aspect of the disclosure is never limited to these embodiments and includes variations implemented within the gist of the aspect of the disclosure. Not all the configurations described below are essential for the aspect of the disclosure.

1. Ink Jet Recording Method

An ink jet recording method according to an embodiment of this aspect of the disclosure is an ink jet recording method performed using an ink jet recording apparatus. The method includes a treatment liquid attachment step, in which a treatment liquid containing a flocculant is attached to a recording medium, and an ink attachment step, in which a water-based ink composition containing a colorant is ejected from an ink jet head and attached to the recording medium. The following describes each element and step.

1.1. Recording Medium

Any type of recording medium can be used in the ink jet recording method according to this embodiment. Preferably, a low-absorbency or non-absorbent recording medium is used because it makes the advantages of the ink jet recording method according to this embodiment more significant.

A low-absorbency or non-absorbent recording medium is one that absorbs little or no ink. When studied by the Bristow test, a low-absorbency or non-absorbent recording medium absorbs 10 mL/m$^2$ or less water from the start of contact until 30 msec$^{1/2}$. The Bristow test is a common method for brief measurement of liquid absorption and has also been adopted by Japan Technical Association of the Pulp and Paper Industry (JAPAN TAPPI). The details of the test method are set forth in No. 51 of JAPAN TAPPI Test Method 2000, which specifies the Bristow test as a method for testing the absorption of liquid in paper and paperboards. A recording medium that is absorbent to liquids is one that is not non-absorbent or low-absorbency to liquids. Being non-absorbent, low-absorbency, and absorbent to liquids herein may be referred to simply as non-absorbent, low-absorbency, and absorbent, respectively.

Examples of such low-absorbency or non-absorbent recording media include ones that have no ink-receiving layer capable of absorbing inks on their recording surface and ones that have a coating layer that absorbs little ink on their recording surface.

Examples of recording media that are non-absorbent to liquids include polymer films or plates, for example of polyvinyl chloride, polyethylene terephthalate, polycarbonate, polystyrene, polyurethane, polyethylene, polypropylene, polyvinyl acetal, or binary or more complicated blends of such polymers, cellulose-derived films or plates, for example of cellulose diacetate, cellulose triacetate, cellulose propionate, cellulose butyrate, cellulose acetate butyrate, or cellulose nitrate, metal foils or plates, for example of iron, silver, copper, or aluminum, plates or films having a deposited layer of any such metal thereon, alloy foils or plates, for example of stainless steel or brass, and a glass sheet.

Examples of recording media that are low-absorbency to liquids include ones that have a coating layer for receiving liquids on their surface (receiving layer). Examples include the above-listed types of films or plates having a surface coated with a material like a hydrophilic polymer or with silica, titanium, or similar particles plus a binder (e.g., a hydrophilic polymer, such as polyvinyl alcohol or polyvinyl pyrrolidone). Examples of paper-based recording media that are low-absorbency to liquids include paper for commercial printing, such as art paper, low coat-weight paper, and matte-coated paper.

Examples of recording media that are absorbent to liquid include paper like ordinary printing paper and dedicated ink jet paper, a sheet having an ink-receiving layer, and fabric.

The recording medium can be, for example, colorless and transparent, translucent, colored and transparent, colored and opaque, or colorless and opaque. The recording medium may be colored and/or translucent or transparent in itself. The recording medium, furthermore, may be shaped like a bag or may be shaped like a sheet. The surface of the recording medium may be pretreated, for example with corona discharges or a primer. Such a surface treatment can help improve the fixation of the image on the recording medium.

In this embodiment, the two-dimensional size of the recording medium used is not critical. The recording medium, moreover, can measure any length in the direction perpendicular to the direction of its transport while in the ink jet recording apparatus. The recording method according to this embodiment, however, is suitable for relatively wide-format ink jet recording apparatuses. When a wide-format apparatus is used, it is preferred that the recording medium measure 0.5 m or more, more preferably 0.7 m or more in that direction.

The thickness of the recording medium is not critical either. Preferably, the recording medium has a thickness of 40.0 μm or more, more preferably 70.0 μm or more, even more preferably 80.0 μm or more. This leads to smoother transport of the recording medium in the ink jet recording apparatus. There is no upper limit, but preferably the thickness of the recording medium is 300 μm or less, more preferably 200 μm or less, even more preferably 100 μm or less, in particular 80 μm or less.

1.2. Treatment Liquid Attachment Step

The ink jet recording method according to this embodiment includes attaching a treatment liquid containing a flocculant to the recording medium.

1.2.1. Treatment Liquid

The treatment liquid contains a flocculant.

1.2.1.1. Flocculant

The treatment liquid contains a flocculant that causes the relevant component(s) of the water-based ink composition to aggregate together. The flocculant reacts with the colorant, resin particles (when present), etc., in the water-based ink composition to cause the colorant and resin particles to aggregate together. The degree of aggregation of the colorant and resin particles caused by the flocculant varies according to the type of the flocculant, colorant, and resin particles and can be controlled by, for example, changing the type of the flocculant, colorant, and/or resin particles or a surface treatment of the colorant and/or resin particles. The effects of the flocculant include, for example, improved color strength of the colorant, improved fixation of the resin particles, and/or increased viscosity of the water-based ink composition on the recording medium.

Any kind of flocculant can be used, but examples include metal salts, acids, and cationic compounds. Examples of cationic compounds that can be used include cationic resins (cationic polymers) and cationic surfactants. Among metal salts, polyvalent metal salts are particularly preferred. Among cationic compounds, cationic resins are particularly preferred. Acids include organic acids and inorganic acids, and organic acids are preferred. It is therefore preferred that the flocculant be selected from cationic resins, organic acids, and polyvalent metal salts. With these types of flocculants, the resulting image is superb in characteristics such as quality and abrasion resistance.

Although polyvalent metal salts are preferred, other metal salts can also be used. It is particularly preferred to use at least one selected from metal salts and organic acids because flocculants in these categories are highly reactive with components of ink. Among cationic compounds, cationic resins are particularly preferred because they are highly soluble in the treatment liquid. It is also possible to use multiple flocculants.

Polyvalent metal salts are compounds formed by a metal ion having a valency of 2 or more and an anion. Examples of metal ions having a valency of 2 or more include the ions of calcium, magnesium, copper, nickel, zinc, barium, aluminum, titanium, strontium, chromium, cobalt, and iron. Of such metal ions that can be a component of polyvalent metal salts, it is particularly preferred to use at least one of the calcium and magnesium ions. The calcium and magnesium ions are potent flocculants for components of ink.

The anion in a polyvalent metal salt is an inorganic or organic ion. That is, a polyvalent metal salt in this embodiment is formed by an inorganic or organic ion and a polyvalent metal. Examples of inorganic ions in this context include the chloride, bromide, iodide, nitrate, sulfate, and hydroxide ions. Examples of organic ions include organic acid ions, such as the carboxylate ion.

Ionic polyvalent metal salts are preferred. In particular, magnesium and calcium salts give the treatment liquid higher stability. The counterion for the polyvalent metal may be an inorganic acid ion or organic acid ion.

Specific examples of polyvalent metal salts include calcium carbonates, such as heavy calcium carbonate and light calcium carbonate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium propionate, calcium acetate, magnesium acetate, and aluminum acetate. One such polyvalent metal salt may be used alone, or two or more may be used in combination. Metal salts that are hydrated in their raw-material form can also be used.

Examples of metal salts other than polyvalent metal salts include salts of monovalent metals, such as sodium salts and potassium salts. Examples include sodium sulfate and potassium sulfate.

Examples of suitable organic acids include poly(meth) acrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumarinic acid, thiophenecarboxylic acid, nicotinic acid, derivatives of these compounds, and salts of these acids and their derivatives. One organic acid may be used alone, or two or more may be used in combination. Metal salts of organic or inorganic acids are included in metal salts as described above.

Examples of inorganic acids include sulfuric acid, hydrochloric acid, nitric acid, and phosphoric acid. One inorganic acid may be used alone, or two or more may be used in combination.

Examples of cationic resins (cationic polymers) include cationic urethane resins, cationic olefin resins, cationic amine resins, and cationic surfactants. Water-soluble cationic polymers are preferred.

For cationic urethane resins, commercially available ones can be used. Examples include HYDRAN CP-7010, CP-7020, CP-7030, CP-7040, CP-7050, CP-7060, and CP-7610 (trade names, Dainippon Ink and Chemicals, Inc.), SUPERFLEX 600, 610, 620, 630, 640, and 650 (trade names, DKS Co. Ltd.), and WBR-2120C and WBR-2122C urethane emulsions (trade names, Taisei Fine Chemical Co., Ltd.).

Cationic olefin resins are resins that have an olefin, such as ethylene or propylene, as their structural backbone, and suitable one(s) can be selected from known ones. Cationic olefin resins in emulsion form, in which the resin has been dispersed in water or an organic or other solvent, can also be used. Commercially available cationic olefin resins can be used, such as ARROWBASE CB-1200 and CD-1200 (trade names, Unitika Ltd.).

Cationic amine resins (cationic amine polymers) include any cationic resin or polymer that has an amino group in its structure, and suitable one(s) can be selected from known ones. Examples include polyamine resins, polyamide resins, and polyallylamine resins. Polyamine resins have an amino group in their polymer backbone, polyamide resins have an amide group in their polymer backbone, and polyallylamine resins have an allyl-derived structure in their polymer backbone.

Examples of cationic polyamine resins include Senka Corporation's UNISENCE KHE103L (hexamethylenediamine/epichlorohydrin resin; pH of a 1% aqueous solution, approximately 5.0; viscosity, 20 to 50 (mPa·s); a 50% by mass solids aqueous solution) and UNISENCE KHE104L (dimethylamine/epichlorohydrin resin; pH of a 1% aqueous solution, approximately 7.0; viscosity, 1 to 10 (mPa·s); a 20% by mass solids aqueous solution). Further specific examples of commercially available cationic polyamine resins include FL-14 (trade name, SNF), ARAFIX 100, 251S, 255, and 255LOX (trade names, Arakawa Chemical), DK-6810, 6853, and 6885 and WS-4010, 4011, 4020, 4024, 4027, and 4030 (trade names, Seiko PMC), PAPYOGEN P-105 (trade name, Senka), Sumirez Resin 650(30), 675A, 6615, and SLX-1 (trade names, Taoka Chemical), Catiomaster® PD-1, 7, 30, A, PDT-2, PE-10, PE-30, DT-EH, EPA-SK01, and TMHMDA-E (trade names, Yokkaichi Chemical), and JETFIX 36N, 38A, and 5052 (trade names, Satoda Chemical Industrial).

Examples of polyallylamine resins include polyallylamine hydrochloride, polyallylamine amidosulfate, allylamine hydrochloride-diallylamine hydrochloride copolymers, allylamine acetate-diallylamine acetate copolymers, allylamine acetate-diallylamine acetate copolymers, allylamine hydrochloride-dimethylallylamine hydrochloride copolymers, allylamine-dimethylallylamine copolymers, polydiallylamine hydrochloride, polymethyldiallylamine hydrochloride, polymethyldiallylamine amidosulfate, polymethyldiallylamine acetate, polydiallyldimethylammonium chloride, diallylamine acetate-sulfur dioxide copolymers, diallylmethylethylammonium ethyl sulfite-sulfur dioxide copolymers, methyldiallylamine hydrochloride-sulfur dioxide copolymers, diallyldimethylammonium chloride-sulfur dioxide copolymers, and diallyldimethylammonium chloride-acrylamide copolymers.

For cationic surfactants, examples include primary, secondary, and tertiary amine salt compounds, alkylamine salts, dialkylamine salts, aliphatic amine salts, benzalkonium salts, quaternary ammonium salts, quaternary alkylammonium salts, alkylpyridinium salts, sulfonium salts, phosphonium salts, onium salts, and imidazolinium salts. Specific examples include hydrochlorides, acetates, and similar salts of laurylamine, coconut amine, and rosin amine as well as lauryltrimethylammonium chloride, cetyltrimethylammonium chloride, benzyltributylammonium chloride, benzalkonium chlorides, dimethylethyllaurylammonium ethyl sulfate, dimethylethyloctylammonium ethyl sulfate, trimethyllaurylammonium hydrochloride, cetylpyridinium chloride, cetylpyridinium bromide, dihydroxyethyllaurylamine, decyldimethylbenzylammonium chloride, dodecyldimethylbenzylammonium chloride, tetradecyldimethylammonium chloride, hexadecyldimethylammonium chloride, and octadecyldimethylammonium chloride.

It is also possible to use more than one of such flocculants. Using at least one selected from polyvalent metal salts, organic acids, and cationic resins helps form an image of higher quality (high color strength in particular). These types of flocculants are more potent than others.

The total flocculant content of the treatment liquid is 0.1% by mass or more and 20% by mass or less for example, preferably 1% by mass or more and 20% by mass or less, more preferably 2% by mass or more and 15% by mass or less of the total mass of the treatment liquid. When the flocculant(s) is dissolved or dispersed in the treatment liquid, too, it is preferred that the percentage be in any of these ranges on a solids basis. A flocculant content of 1% by mass or more is enough for the flocculant(s) to flocculate the relevant component(s) of the water-based ink composition effectively. A flocculant content of 20% by mass or less leads to better dissolution or dispersion of the flocculant(s) in the treatment liquid, thereby helping improve, for example, the storage stability of the treatment liquid.

Preferably, the solubility of the flocculant in 100 g of water at 25° C. is 1 g or more, more preferably 3 g or more and 80 g or less. This ensures the flocculant dissolves well in the treatment liquid even when the treatment liquid contains a highly hydrophobic organic solvent.

1.2.1.2. Extra Ingredients

Besides the flocculant, the treatment liquid may contain ingredients such as water, organic solvents, surfactants, excipients, preservatives/antimolds, antirusts, chelating agents, viscosity modifiers, antioxidants, and fungicides unless its functions are impaired.

Water

The treatment liquid may contain water. The water is a component that evaporates away as the treatment liquid dries. Preferably, the water is of a type from which ionic impurities have been removed to the lowest possible levels, such as deionized water, ultrafiltered water, reverse osmosis water, distilled water, or any other type of purified or ultrapure water. The use of sterilized water, for example sterilized by ultraviolet irradiation or adding hydrogen peroxide, is preferred because it helps control the development of molds and bacteria when the treatment liquid is stored long.

The treatment liquid may be, preferably is, a so-called water-based composition, which contains 40% by mass or more water as its primary solvent. When made as a water-based composition, the treatment liquid is substantially odorless and, by virtue of 40% by mass or more, preferably 50% by mass or more, of it being water, offers the advantage of being environmentally-friendly.

Organic Solvent

The treatment liquid according to this embodiment may contain an organic solvent. Using an organic solvent can help, for example, accelerate the drying of the recording and enhance the fastness of the image. An organic solvent also helps improve the ejection stability of the treatment liquid. Water-miscible organic solvents are preferred.

A function of the organic solvent is to improve the wettability of the treatment liquid on the recording medium and to enhance the water retention of the treatment liquid. The organic solvent reduces the surface tension of the treatment liquid, thereby helping the treatment liquid leave nozzles and fly smoothly as droplets when ejected from an ink jet head. As a result, the droplets of the treatment liquid wet and spread over the recording medium better.

Examples of organic solvents include esters, alkylene glycol ethers, cyclic esters, nitrogen-containing solvents, and polyhydric alcohols. Examples of nitrogen-containing solvents include cyclic amides and acyclic amides. Examples of acyclic amides include alkoxyalkylamides.

Examples of esters include glycol monoacetates, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate, and glycol diesters, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, and dipropylene glycol acetate propionate.

Examples of cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone and compounds derived from such lactones by substituting hydrogen(s) in the methylene group next to the carbonyl group with a C1 to C4 alkyl group.

Examples of nitrogen-containing solvents include acyclic amides and cyclic amides. Examples of acyclic amides include alkoxyalkylamides.

Examples of alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-isopropoxy-N,N-dimethylpropionamide, 3-isopropoxy-N,N-diethylpropionamide, 3-isopropoxy-N,N-methylethylpropionamide, 3-tert-butoxy-N,N- dimethylpropionamide, 3-tert-butoxy-N,N-diethylpropionamide, and 3-tert-butoxy-N,N-methylethylpropionamide.

It is also preferred to use an alkoxyalkylamide, which is a type of acyclic amide and is represented by general formula (1) below.

$$R^1\text{—}O\text{—}CH_2CH_2\text{—}(C\!\!=\!\!O)\text{—}NR^2R^3 \qquad (1)$$

In formula (1) above, $R^1$ denotes a C1 to C4 alkyl group, and $R^2$ and $R^3$ each independently denote a methyl or ethyl group. The "C1 to C4 alkyl group" can be a linear or branched alkyl group. To name a few, it can be a methyl, ethyl, n-propyl, isopropyl, n-butyl, sec-butyl, isobutyl, or tert-butyl group. One compound represented by formula (1) above may be used alone, or two or more may be used as a mixture.

Examples of cyclic amides include lactams, such as pyrrolidones including 2-pyrrolidone, 1-methyl-2-pyrrolidone, 1-ethyl-2-pyrrolidone, 1-propyl-2-pyrrolidone, and 1-butyl-2-pyrrolidone. These cyclic amides are advantageous in that with such an amide in the treatment liquid, resin particles form film faster (described below). 2-Pyrrolidone is particularly preferred.

An alkylene glycol ether can be any monoether or diether of an alkylene glycol, preferably an alkyl ether. Specific examples include alkylene glycol monoalkyl ethers, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether, and alkylene glycol dialkyl ethers, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

Preferably, the alkylene glycol as a component of the alkylene glycol ether is a C2 to C8, more preferably C2 to C6, even more preferably C2 to C4, in particular C2 or C3 alkylene glycol. There may be condensations between hydroxy groups of molecules of the alkylene glycol as a component of the alkylene glycol ether. The number of condensations is preferably from 1 to 4, more preferably from 1 to 3, even more preferably 2 or 3.

Preferably, the ether as a component of the alkylene glycol is an alkyl ether. The alkyl ether is preferably an ether of a C1 to C4 alkyl, more preferably an ether of a C2 to C4 alkyl.

Alkylene glycol ethers are advantageous in that they help the treatment liquid wet the recording medium well by virtue of their superior permeability. With an alkylene glycol ether, therefore, the resulting image is of high quality. In light of this, monoethers are particularly preferred.

Examples of polyhydric alcohols include 1,2-alkanediols (e.g., alkanediols such as ethylene glycol, propylene glycol (also known as propane-1,2-diol), 1,2-butanediol, 1,2-pentanediol, 1,2-hexanediol, 1,2-heptanediol, and 1,2-octanediol) and polyhydric alcohols other than 1,2-alkanediols (polyols) (e.g., ethylene glycol, propylene glycol, diethylene glycol, dipropylene glycol, 1,3-propanediol, 1,3-butanediol (also known as 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, and glycerol).

Polyhydric alcohols can be divided into alkanediols and polyols.

An alkanediol in this context is a diol of a C5 or longer alkane. The alkane is preferably a C5 to C15, more preferably C6 to C10, even more preferably C6 to C8 alkane. 1,2-Alkanediols are preferred.

A polyol in this context is a polyol of a C4 or shorter alkane or a condensate formed by intermolecular condensation between hydroxy groups of a polyol of a C4 or shorter alkane. The alkane is preferably a C2 or C3 alkane. The number of hydroxy groups in the molecule of the polyol is 2 or more, preferably 5 or less, more preferably 3 or less. When the polyol is a condensate as described above, the number of intermolecular condensations is 2 or more, preferably 4 or less, more preferably 3 or less. One polyhydric alcohol alone or a mixture of two or more can be used.

Alkanediols and polyols can function primarily as penetration solvents and/or moisturizing solvents. Alkanediols, however, tend to behave more as penetration solvents, and polyols tend to behave more as moisturizing solvents.

Alkanediols are advantageous in that they help the treatment liquid wet and spread over the recording medium well by virtue of their strong tendency to behave as penetration solvents. With an alkanediol, therefore, the resulting image is of high quality.

Polyols help enhance water retention in particular, by virtue of their superb hydrophilicity. With a polyol, therefore, the treatment liquid is superior especially in preventing clogging. In particular, using a polyol having a normal boiling point of 280.0° C. or below also ensures the treatment liquid dries quickly, thereby making the recording highly robust.

The treatment liquid may contain one such organic solvent as listed above alone or may contain two or more in combination. When two or more organic solvents are contained, the organic solvent content is the total percentage of them.

Preferably, the organic solvent content of the treatment liquid is 2.0% by mass or more of the total amount of the treatment liquid. The organic solvent content is preferably 40.0% by mass or less, more preferably from 5.0% to 30.0% by mass, even more preferably from 10.0% to 25.0% by mass.

Organic solvents having a normal boiling point of 160° C. to 280° C. are preferred. Preferably, the percentage of organic solvents having a normal boiling point exceeding 280° C. is not more than 2.0% by mass, more preferably not more than 1.0% by mass, even more preferably not more than 0.5% by mass of the total amount of the treatment liquid. The percentage of organic solvents having a normal boiling point exceeding 280° C. may even be 0.0% by mass.

Surfactant

The treatment liquid may contain a surfactant. A function of the surfactant is to improve the wettability of the treatment liquid on the recording medium or a substrate by reducing the surface tension of the treatment liquid. Acetylene glycol surfactants, silicone surfactants, and fluorosurfactants are particularly preferred.

Any kind of acetylene glycol surfactant can be used, but examples include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all are trade names; Air Products and Chemicals), OLFINE B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (all are trade names; Nissin Chemical Industry), and ACETYLENOL E00, E00P, E40, and E100 (all are trade names; Kawaken Fine Chemicals).

Any kind of silicone surfactant can be used, but an example of a preferred class is polysiloxane compounds. Any polysiloxane compound can be used, but an example is polyether-modified organosiloxanes. Examples of commercially available polyether-modified organosiloxanes include BYK-306, BYK-307, BYK-333, BYK-341, BYK-345, BYK-346, and BYK-348 (trade names, BYK Japan) and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, Shin-Etsu Chemical).

As for fluorosurfactants, a preferred class is fluorine-modified polymers. Specific examples include BYK-3440 (trade name, BYK Japan), SURFLON S-241, S-242, and S-243 (trade names, AGC Seimi Chemical), and FTERGENT 215M (trade name, NEOS).

The treatment liquid may contain multiple surfactants. The percentage of the surfactant(s), when contained, is preferably 0.1% by mass or more and 2.0% by mass or less, more preferably 0.2% by mass or more and 1.5% by mass or less, even more preferably 0.3% by mass or more and 1.0% by mass or less of the total mass of the treatment liquid.

It should be noted that those compounds listed above as examples of surfactants are regarded as not being organic solvents as described above.

pH-Adjusting Agent

The treatment liquid according to this embodiment may contain a pH-adjusting agent. Using a pH-adjusting agent helps, for example, retard or accelerate the dissolution of impurities from materials forming the channel through which the treatment liquid flows, thereby helping control detergency against the flow channel for the treatment liquid. Examples of pH-adjusting agents include urea compounds, amines, morpholines, piperazines, and aminoalcohols, such as triethanolamine. Examples of urea compounds include urea, ethylene urea, tetramethylurea, thiourea, 1,3-dimethyl-2-imidazolidinone, and betaines (e.g., trimethylglycine, triethylglycine, tripropylglycine, triisopropylglycine, N,N,N-trimethylalanine, N,N,N-triethylalanine, N,N,N-triisopropylalanine, N,N,N-trimethylmethylalanine, carnitine, and acetylcarnitine). Examples of amines include diethanolamine, triethanolamine, and triisopropanolamine.

It should be noted that those compounds listed above as examples of pH-adjusting agents are regarded as not being organic solvents as described above. For example, triethanolamine is liquid at room temperature and has a normal boiling point of approximately 208° C., but is not regarded as an organic solvent as described above.

Fungicide and Preservative

The treatment liquid according to this embodiment may contain a preservative.

The antifungal and antibacterial properties of a preservative improve the storage stability of the treatment liquid. A possible advantage of using a preservative is that it allows the treatment liquid to serve as a maintenance fluid when the printer is stored long without being used. Examples of preferred preservatives include PROXEL CRL, PROXEL BDN, PROXEL GXL, PROXEL XL-2, PROXEL IB, and PROXEL TN.

Others

The treatment liquid may optionally contain additives, such as chelating agents, antirusts, antimolds, antioxidants, antireductants, drying agents, and water-soluble resins.

Examples of chelating agents include ethylenediaminetetraacetic acid (EDTA) and the nitrilotriacetate, hexametaphosphate, pyrophosphate, and metaphosphate of ethylenediamine.

1.2.2. Production and Characteristics of the Treatment Liquid and Attachment to the Recording Medium Preferably, the treatment liquid used in the recording method according to this embodiment has a surface tension at 25° C. of 40 mN/m or less, more preferably 38 mN/m or less, even more preferably 35 mN/m or less, still more preferably 30 mN/m or less. This ensures the treatment liquid wets and spreads over the recording medium moderately. The surface tension can be measured by wetting a platinum plate with the treatment liquid and checking the surface tension under 25° C. conditions using CBVP-Z automated surface tensiometer (Kyowa Interface Science).

The attachment of the treatment liquid to the recording medium can be achieved by a direct or indirect contact technique, such as ink jet technology, coating, spraying the recording medium with the treatment liquid, dipping the recording medium in the treatment liquid, or applying the treatment liquid using a brush or similar tool. A combination of multiple techniques can also be used.

Preferably, the treatment liquid is attached to the recording medium by ink jet technology. When this is the case, it is preferred that the treatment liquid have a viscosity at 20° C. of 1.5 mPa·s or more and 15 mPa·s or less, more preferably 1.5 mPa·s or more and 7 mPa·s or less, even more preferably 1.5 mPa·s or more and 5.5 mPa·s or less. Using ink jet technology is an easy way to attach the treatment liquid to an intended region of the recording medium efficiently.

It is not critical how the treatment liquid according to this embodiment is produced. For example, the treatment liquid can be produced by mixing its ingredients together in any order and then optionally removing impurities, for example by filtration. A suitable method for mixing the ingredients is to add the materials one by one to a container equipped with a stirring device, such as a mechanical or magnetic stirrer, and mixing the materials together by stirring.

1.3. Ink Attachment Step

The ink jet recording method according to this embodiment includes an ink attachment step, in which a water-based ink composition containing a colorant is ejected from an ink jet head and attached to the recording medium. The ink attachment step is carried out with the recording medium supported and heated by a recording medium support. In the ink attachment step, the recording medium is heated so that the surface thereof reaches a maximum temperature of 28.0° C. or more and 45.0° C. or less where the recording medium is supported by the recording medium support and faces the ink jet head. Further details of the recording medium support (platen) are provided later herein.

1.3.1. Water-Based Ink Composition

The water-based ink composition is an ink composition that is water-based as defined above. The water-based ink composition contains a colorant.

1.3.1.1. Colorant

The water-based ink composition contains a colorant. Both pigments and dyes can be used. Examples of colorants that can be used include inorganic pigments including carbon black and titanium white, organic pigments, solvent dyes, acidic dyes, direct dyes, reactive dyes, basic dyes, disperse dyes, and sublimation dyes. In the water-based ink composition according this embodiment, the colorant may be dispersed with a dispersing resin.

Examples of inorganic pigments that can be used include carbon black (C.I. Pigment Black 7) pigments, such as furnace black, lamp black, acetylene black, and channel black, iron oxide, titanium oxide, zinc oxide, and silica.

Examples of organic pigments include quinacridone pigments, quinacridone quinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments.

Specific examples of organic pigments that can be used in the water-based ink composition include the following.

Examples of cyan pigments include C.I. Pigment Blue 1, 2, 3, 15:3, 15:4, 15:34, 16, 22, and 60 and C.I. Vat Blue 4 and 60. An example of a preferred cyan pigment is one or a mixture of two or more selected from the group consisting of C.I. Pigment Blue 15:3, 15:4, and 60.

Examples of magenta pigments include C.I. Pigment Red 5, 7, 12, 48 (Ca), 48 (Mn), 57 (Ca), 57:1, 112, 122, 123, 168, 184, and 202 and C.I. Pigment Violet 19. An example of a preferred magenta pigment is one or a mixture or solid solution of two or more selected from the group consisting of C.I. Pigment Red 122, 202, and 209 and C.I. Pigment Violet 19.

Examples of yellow pigments include C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, and 185. An example of a preferred yellow pigment is one or a mixture of two or more selected from the group consisting of C.I. Pigment Yellow 74, 109, 110, 128, and 138.

Pigments in other colors can also be used. Examples include orange and green pigments.

The pigments listed above are merely examples of suitable pigments and do not limit any aspect of the present disclosure. One or a mixture of two or more such pigments may be used, with or without dye(s).

A pigment may be dispersed with a dispersant selected from, for example, water-soluble resins, water-dispersible resins, and surfactants. Alternatively, the surface of the particles of the pigment may be oxidized or sulfonated, for example with ozone, hypochlorous acid, or fuming sulfuric acid, to render the pigment self-dispersible.

When a pigment is dispersed with a dispersing resin in the ink according to this embodiment, the ratio between the pigment and the dispersing resin is preferably from 10:1 to 1:10, more preferably from 4:1 to 1:3. Preferably, the particles of the dispersed pigment have a maximum diameter of less than 500 nm and a volume-average diameter of 300 nm or less when measured by dynamic light scattering. More preferably, the volume-average diameter is 200 nm or less.

Examples of dyes that can be used in the water-based ink composition include water-soluble dyes, such as acidic dyes, direct dyes, reactive dyes, and basic dyes, and water-dispersible dyes, such as disperse dyes, solvent dyes, and sublimation dyes.

The dyes listed above are merely examples of suitable colorants and do not limit any aspect of the present disclosure. One or a mixture of two or more such dyes may be used, with or without pigment(s).

The colorant content can be adjusted to suit the purpose of use of the ink composition. Preferably, the colorant content is 0.10% by mass or more and 20.0% by mass or less, more preferably 0.20% by mass or more and 15.0% by mass or less, even more preferably 1.0% by mass or more and 10.0% by mass or less.

When the colorant is a pigment, the volume-average diameter of the pigment particles is preferably 10.0 nm or more and 200.0 nm or less, more preferably 30.0 nm or more and 200.0 nm or less, even more preferably 50.0 nm or more and 150.0 nm or less, in particular 70.0 nm or more and 120.0 nm or less.

1.3.1.2. Extra Ingredients

Besides the colorant, the water-based ink composition may contain ingredients such as resin particles, waxes, organic solvents, surfactants, excipients, preservatives/antimolds, antirusts, chelating agents, viscosity modifiers, antioxidants, and fungicides unless its functions are impaired.

Resin Particles

The water-based ink composition according to this embodiment may contain resin particles. The resin particles function as a fixing resin, or to improve the adhesion and abrasion resistance of the components of the water-based ink composition attached to the recording medium.

Examples of resin particles include particles of resins such as urethane resins, acrylic resins, ester resins, fluorene resins, polyolefin resins, rosin-modified resins, terpene resins, polyester resins, polyamide resins, epoxy resins, vinyl chloride resins, and ethylene vinyl acetate resins. Particles of these types of resins are often handled in emulsion form, but the resin particles in this embodiment may be a powder. One type of resin particles alone or two or more in combination can be used.

Resins that have a urethane bond are collectively referred to as urethane resins. They also include resins that contain a non-urethane bond, such as polyether urethane resins, which contain an ether bond in their backbone, polyester urethane resins, which contain an ester bond in their backbone, and polycarbonate urethane resins, which contain a carbonate bond in their backbone. Commercially available urethane resins can also be used. For example, one or more may be selected from commercially available urethane resins such as SUPERFLEX 210, 460, 460s, 840, and E-4000 (trade names, DKS Co., Ltd.), RESAMINE D-1060, D-2020, D-4080, D-4200, D-6300, and D-6455 (trade names, Dainichiseika Color & Chemicals Mfg. Co., Ltd.), Takelac WS-6020, WS-6021, and W-512-A-6 (trade names, Mitsui Chemicals Polyurethanes, Inc.), Sancure 2710 (trade name, LUBRIZOL), and PERMARIN UA-150 (trade name, Sanyo Chemical Industries).

Polymers obtained by polymerizing at least an acrylic monomer, such as (meth)acrylic acid or a (meth)acrylate, are collectively referred to as acrylic resins. Examples include resins obtained from acrylic monomers and copolymers of acrylic and other monomers. Examples of the latter include acryl-vinyl resins, which are copolymers of acrylic and vinyl monomers, such as copolymers of an acrylic monomer and styrene or a similar vinyl monomer. Acrylamide and acrylonitrile, for example, are also acrylic monomers that can be used.

Commercially available resin emulsions made with an acrylic resin can also be used. For example, one or more may be selected from commercially available resin emulsions such as FK-854, Mowinyl 952B and 718A (trade names, Japan Coating Resin), Nipol LX852 and LX874 (trade names, Zeon), POLYSOL AT860 (trade name, Showa Denko K.K.), and VONCOAT AN-1190S, YG-651, AC-501, AN-1170, and 4001 (trade names, DIC).

As mentioned above, the category of acrylic resins herein includes styrene-acrylic resins. The expression (meth) acrylic herein refers to at least one of acrylic and methacrylic.

Styrene-acrylic resins are copolymers of the styrene monomer and an acrylic monomer. Examples include styrene-acrylic acid copolymers, styrene-methacrylic acid copolymers, and styrene-α-methylstyrene-acrylic acid copolymers. Commercially available styrene-acrylic resins can also be used. Examples include Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade names, BASF) and Mowinyl 966A and 975N (trade names, Japan Coating Resin).

The category of vinyl chloride resins includes vinyl chloride-vinyl acetate copolymers. Examples of ester resins include polymers containing an acrylate as a monomer unit, such as styrene-methacrylic acid-acrylate copolymers, styrene-α-methylstyrene-acrylic acid copolymers, and styrene-α-methylstyrene-acrylic acid-acrylate copolymers.

Polyolefin resins are resins that have an olefin, such as ethylene, propylene, or butylene, as their structural backbone, and suitable one(s) can be selected from known ones. Commercially available polyolefin resins can be used. For example, one or more may be selected from commercially available olefin resins such as ARROWBASE CB-1200 and CD-1200 (trade names, UNITIKA Ltd.).

The resin particles may be supplied in emulsion form. Examples of commercially available resin emulsions include MICROGEL E-1002 and E-5002 (trade names, Nippon Paint, styrene-acrylic resin emulsions), VONCOAT AN-1190S, YG-651, AC-501, AN-1170, 4001, and 5454 (trade names, DIC, styrene-acrylic resin emulsions), POLYSOL AM-710, AM-920, AM-2300, AP-4735, AT-860, and PSASE-4210E (acrylic resin emulsions), POLYSOL AP-7020 (styrene-acrylic resin emulsion), POLYSOL SH-502 (vinyl acetate resin emulsion), POLYSOL AD-13, AD-2, AD-10, AD-96, AD-17, and AD-70 (ethylene-vinyl acetate resin emulsions), POLYSOL PSASE-6010 (ethylene-vinyl acetate resin emulsion) (trade names, Showa Denko), POLYSOL SAE1014 (trade name, Zeon, a styrene-acrylic resin emulsion), SAIVINOL SK-200 (trade name, Saiden Chemical Industry, an acrylic resin emulsion), AE-120A (trade name, JSR, an acrylic resin emulsion), AE373D (trade name, Emulsion Technology, a carboxy-modified styrene-acrylic resin emulsion), SEIKADYNE 1900W (trade name, Dainichiseika Color & Chemicals Mfg., an ethylene-vinyl acetate resin emulsion), VINYBLAN 2682 (acrylic resin emulsion), VINYBLAN 2886 (vinyl acetate-acrylic resin emulsion), VINYBLAN 5202 (acetic acid-acrylic resin emulsion) (trade names, Nissin Chemical Industry), VINYBLAN 700 and 2586 (trade names, Nissin Chemical Industry), elitel KA-5071S, KT-8803, KT-9204, KT-8701, KT-8904, and KT-0507 (trade names, Unitika, polyester resin emulsions), Hytec SN-2002 (trade name, Toho Chemical, a polyester resin emulsion), Takelac W-6020, W-635, W-6061, W-605, W-635, and W-6021 (trade names, Mitsui Chemicals Polyurethanes, urethane resin emulsions), SUPERFLEX 870, 800, 150, 420, 460, 470, 610, 620, and 700 (trade names, DKS, urethane resin emulsions), PERMARIN UA-150 (trade name, Sanyo Chemical Industries, Ltd., a urethane resin emulsion), Sancure 2710 (trade name, Lubrizol Japan, a urethane resin emulsion), NeoRez R-9660, R-9637, and R-940 (trade names, Kusumoto Chemicals Ltd., urethane resin emulsions), ADEKA BONTIGHTER HUX-380 and 290K (trade names, ADEKA Corporation, urethane resin emulsions), Mowinyl 966A and Mowinyl 7320 (trade names, Japan Coating Resin), Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade names, BASF), NK Binder R-5HN (trade name, Shin-Nakamura Chemical Co., Ltd.), HYDRAN WLS-210 (trade name, DIC Corporation, a non-crosslinked polyurethane), and Joncryl 7610 (trade name, BASF).

Preferably, the resin particles are of one or more resins selected from urethane resins, acrylic resins, ester resins, and vinyl chloride resins. These types of resins are better than others in adhesion and abrasion resistance. Particles of urethane and/or acrylic resin(s) are more preferred. They help further improve the adhesion and abrasion resistance of the components of the water-based ink composition attached to the recording medium.

The percentage of the resin particles, when contained, in the water-based ink composition is 0.1% by mass or more and 20% by mass or less on a solids basis, preferably 0.5% by mass or more and 15.0% by mass or less, more preferably 1.0% by mass or more and 15.0% by mass or less, even more preferably 2.0% by mass or more and 10.0% by mass or less of the total mass of the water-based ink composition.

Wax

The water-based ink composition according to this embodiment may contain wax. Examples of waxes that can be used include vegetable/animal waxes, such as carnauba wax, candelilla wax, beeswax, rice bran wax, and lanolin; petroleum waxes, such as paraffin waxes, microcrystalline waxes, polyethylene waxes, oxidized polyethylene waxes, polypropylene waxes, and petrolatum; mineral waxes, such as montan wax and ozokerite; and synthetic waxes, such as carbon waxes, hoechst waxes, polyolefin waxes, and stearic acid amide; and natural/synthetic wax emulsions, such as α-olefin-maleic anhydride copolymers, and compound waxes. One such wax alone or a mixture of two or more can be used. Of these, polyolefin waxes (in particular, polyethylene wax and polypropylene wax) are particularly preferred because they more effective than other types of waxes in improving the abrasion resistance of the image.

It is also possible to use commercially available wax(es) directly. Examples include NOPCOTE PEM-17 (trade name, San Nopco Ltd.), CHEMIPEARL W4005 (trade name, Mitsui Chemicals, Inc.), and AQUACER 515, 539, and 593 (trade names, BYK Japan K.K.).

Preferably, the melting point of the wax is 100.0° C. or more and 180.0° C. or less to reduce the risk that the wax will melt during a heating step in the recording method to such an extent that its performance will degrade. More preferably, the melting point of the wax is 105.0° C. or more and 140° C. or less, even more preferably 110.0° C. or more and 135.0° C. or less.

The wax may be supplied in emulsion or suspension form. Preferably, the wax content is 0.05% by mass or more and 5.0% by mass or less on a solids basis, more preferably 0.1% by mass or more and 5.0% by mass or less, even more preferably 0.1% by mass or more and 2.0% by mass or less of the total mass of the water-based ink composition. Wax present in any such amount gives strong abrasion resistance to the recorded image.

Others

For other ingredients, such as water, organic solvents, surfactants, excipients, preservatives/antimolds, antirusts, chelating agents, viscosity modifiers, antioxidants, and fungicides, examples of substances that can be used are the same as in the Treatment Liquid section above. These ingredients are as described in Section 1.2.1.2, Extra Ingredients (read "treatment liquid" as "water-based ink composition") and are not discussed in detail here.

For those organic solvents that may be contained in the water-based ink composition, ones having a normal boiling point of 280.0° C. or below are preferred. Organic solvents having a normal boiling point of 150.0° C. or more and 280.0° C. or less are more preferred, organic solvents having a normal boiling point of 170.0° C. or more and 280.0° C. or less are even more preferred, organic solvents having a normal boiling point of 180.0° C. or more and 280.0° C. or less are still more preferred, organic solvents having a normal boiling point of 190.0° C. or more and 270.0° C. or less are further preferred, and organic solvents having a normal boiling point of 200.0° C. or more and 250.0° C. or less are particularly preferred.

More preferably, the water-based ink composition contains organic solvent(s) having a normal boiling point of 180.0° C. or more and 280.0° C. or less in an amount of 20.0% by mass or more and 35.0% by mass or less, even more preferably 25.0% by mass or more and 30.0% by mass or less.

It is, furthermore, preferred that the percentage of organic solvents having a normal boiling point exceeding 280.0° C. be 2.0% by mass or less, more preferably 1.5% by mass or less, even more preferably 1.0% by mass or less of the total amount of the water-based ink composition (i.e., it is preferred that the ink composition should not contain such organic solvents beyond these levels). The water-based ink composition may even be free of such organic solvents. That is, the percentage of organic solvents having a normal boiling point exceeding 280.0° C. may be 0.0% by mass. This ensures quick drying of the water-based ink composition attached to the recording medium, thereby helping improve the adhesion of the ink composition to the recording medium.

Examples of organic solvents having a normal boiling point exceeding 280.0° C. include glycerol and polyethylene glycol monomethyl ether.

1.3.2. Characteristics and Other Details of the Water-Based Ink Composition

The water-based ink composition is attached to the recording medium by ink jet technology (ink attachment step). It is therefore preferred that the viscosity of the water-based ink composition be 1.5 mPa·s or more and 15.0 mPa·s or less, more preferably 1.5 mPa·s or more and 7.0 mPa·s or less, even more preferably 1.5 mPa·s or more and 5.5 mPa·s or less at 20° C. By virtue of ejection from an ink jet head to attach the water-based ink composition to the recording medium, it is easy to form an intended image on the recording medium efficiently.

Preferably, the water-based ink composition used in the ink jet recording method according to this embodiment has a surface tension at 25.0° C. of 40.0 mN/m or less, more preferably 38.0 mN/m or less, even more preferably 35.0 mN/m or less, still more preferably 30.0 mN/m or less so that it will wet and spread over the recording medium moderately.

1.3.3. Production of the Water-Based Ink Composition

It is not critical how the water-based ink composition according to this embodiment is produced. For example, the water-based ink composition can be produced by mixing its ingredients together in any order and then optionally removing impurities, for example by filtration. A suitable method for mixing the ingredients is to add the materials one by one to a container equipped with a stirring device, such as a mechanical or magnetic stirrer, and mixing the materials together by stirring.

1.3.4. Aggregation Properties of the Ink Composition

The water-based ink composition is prepared so that the ratio between absorbances A and B (A/B) is 0.5 or more and 0.95 or less. Absorbance A is that of a 0.1% by mass mixture of the water-based ink composition in the treatment liquid at the peak wavelength within the range of 380.0 nm to 680 nm, and absorbance B is that of a 0.1% by mass mixture of the water-based ink composition in purified water at the same wavelength.

By virtue of the ratio (A/B) being 0.5 or more and 0.95 or less, in particular 0.5 or more, the cohesive component(s) of the water-based ink composition aggregates only to a limited extent even when a mist of the treatment liquid reaches the ink composition present near nozzles. The nozzles therefore do not easily clog and, even when clogged, recover quickly.

By virtue of the ratio (A/B) being 0.95 or less, furthermore, the ink reacts sufficiently well upon contact with the treatment liquid. The resulting image is therefore of high quality.

When the ratio (A/B) is 0.5 or more and 0.95 or less, in particular 0.5 or more, however, the rate of reaction between the ink and the treatment liquid is slow. The cohesive component(s) of the ink can therefore aggregate only slowly while the image is being formed. When this occurs, a factor that determines how fast the cohesive component(s) in the image aggregates is how fast the mixture of the treatment liquid and the water-based ink composition on the recording medium dries. In this embodiment, the ink attachment step is carried out with the recording medium heated and supported by a recording medium support (platen). The aggregation speed, therefore, can vary with the amount of heat the recording medium receives from the platen.

An example is when the recording medium passes over a platen having an uneven surface. The drying speed is different between the image on the portions of the recording medium that pass over raised areas of the platen and that on the portions that pass over sunken areas. The degree of aggregation therefore varies, and the color strength can be nonuniform, even within the same image. This nonuniformity in color strength may be referred to as "in-plane color differences" herein. According to studies by the inventor, in-plane color differences are significant particularly when a wide-format ink jet recording apparatus is used. A wide-format ink jet recording apparatus is one for use with recording media that measure 0.5 m or more in the direction perpendicular to their direction of transport.

It is therefore preferred that the recording medium measure in the direction perpendicular to its direction of transport (or have a width of) 0.5 m or more, more preferably 1.0 m or more, even more preferably 1.5 m or more. There is no upper limit, but preferably the width of the recording medium is 5.0 m or less.

In-plane color differences, furthermore, become more serious with increasing temperature variations within the print surface of the recording medium. At low temperatures, the inventor believes, ink dots have only slightly dried when the ink is mixed with the treatment liquid. At high temperatures, much water has evaporated away, and the ink is thick and viscous when mixed with the treatment liquid. Particles of the colorant are therefore mixed to different degrees at low and high temperatures, and the resulting image looks different in color density from part to part.

One case in which the platen supports the recording medium with a non-flat surface is when the support surface is uneven. The raised areas of the support surface touch the recording medium and deliver much heat from the platen. The recording medium in these areas is therefore heated to higher temperatures. The sunken areas do not touch the recording medium and deliver little heat from the platen. The recording medium in these areas is therefore heated to lower temperatures. In the sunken areas, furthermore, the platen may be at different distances from the recording medium. The recording medium may therefore suffer great temperature variations at some locations.

In this way, the temperature of the recording medium varies greatly between the portions that pass over the raised areas of the platen and the portions that pass over the sunken areas. As a result, in-plane color differences occur.

An example of a case in which the support surface of the platen is uneven is when the support surface has projections and depressions for discontinuous support of the recording medium. The projections are also referred to as ribs, and an example of a ribbed support surface is seen in FIG. 1 of JP-A-2009-234105.

In the ink jet recording method according to this embodiment, the recording medium support has a flat support surface for supporting the recording medium. By virtue of this, in-plane color differences are sufficiently small despite the absorbance ratio (A/B) for the water-based ink composition being 0.5 or more and 0.95 or less.

An example of a "flat" support surface of the recording medium support to support a recording medium thereon is one that has no projections and depressions for discontinuous support of the recording medium. The support surface used in this embodiment can therefore be, for example, one that has no ribs.

Preferably, the support surface touches the recording medium in 90.0% or more by area of the portion where it supports the recording medium and faces the ink jet head (portion from which the ink is ejected) during a recording job.

Alternatively, a support surface that touches the recording medium in 90.0% or more by area can be defined as a flat support surface. For a flat support surface, further discussion is provided later.

A way to control the absorbance ratio (A/B) is to change the reactivity between the water-based ink composition and the treatment liquid. The ratio (A/B) decreases with reduced reactivity. It is enough to modify the reactivity of one of the treatment liquid and the ink.

The reactivity of the treatment liquid can be controlled by the amount or type of flocculant used therein. The reactivity increases with increased flocculant content. The manufacturer can prepare treatment liquids with different flocculants, mix them with the ink, find the relationship between the kind of flocculant and absorbance, and select a flocculant that gives the desired reactivity.

The reactivity of the water-based ink composition can be controlled by, for example, the zeta potential of the ink composition. In general, reactivity increases with increasing absolute zeta potential. That is, the ratio (A/B) tends to increase with increasing absolute zeta potential.

A way to control the zeta potential of the water-based ink composition is to adjust the acid value of the dispersing resin used to disperse the colorant in the ink, or to adjust the acid value of the colorant itself when no dispersing resin is used. For an ink containing resin particles, the zeta potential can be controlled by adjusting the acid value of the emulsifier, when used to disperse the resin particles, or by adjusting the acid value of the resin forming the resin particles when no emulsifier is used.

In general, the zeta potential increases as these acid values increase. A negative zeta potential of the ink is preferred by virtue of easier control.

An acid value in this context refers to a value measured as set forth in JIS K 0070: 1992 and is the amount of potassium hydroxide (mg) required to neutralize 1 g of the resin, for example, completely.

A possible way to determine the absorbances and the ratio (A/B) is as follows. To 40 g of purified water, 0.04 g of the water-based ink composition is added dropwise and stirred. Absorbance is measured on the resulting liquid at the peak wavelength within the range of 380.0 nm to 680 nm (absorbance B). The water-based ink composition is added dropwise to 40 g of the treatment liquid to achieve the same concentration and stirred, and absorbance is measured on the resulting liquid at the same wavelength (absorbance A). The ratio (A/B) is determined. Absorbance A is measured at the peak wavelength determined in the measurement of absorbance B. Three measurements are averaged. The absorbances can be measured using, for example, JASCO V-700 UV-visible spectrophotometer. The mixtures are allowed to stand for 5 minutes before measurement, and then the top of the liquid surface is sampled.

When the spectrum has only one peak within the wavelength range of 380.0 nm to 680 nm, the peak wavelength is the wavelength at which the spectrum peaks. When the spectrum has multiple peaks within this wavelength range, the wavelength at which the spectrum has the highest peak is the peak wavelength. When the spectrum has no peak within this wavelength range, the wavelength at which absorbance is highest within the range is the peak wavelength. It should be noted that the spectrum in the last case has no peak at the peak wavelength. That is, in this embodiment, the term "peak wavelength" does not need to be a wavelength at which the spectrum peaks, but can be a wavelength at which absorbance is highest within the wavelength range of 380.0 nm to 680 nm. Absorption spectra of inks, depending on their colors, may be free of peaks within this wavelength range.

With a colorant that exhibits strong cohesion with the flocculant, the aggregates do not easily redisperse even when the ink is stirred. According to the Lambert-Beer law, absorbance is proportional to the concentration of the colorant. Therefore, the inventor believes, the lower absorbance A, the smaller the concentration of redispersed colorant.

Preferably, the absorbance ratio (A/B) is 0.6 or more, more preferably 0.7 or more, even more preferably 0.8 or more. An absorbance ratio in any of these ranges is advantageous in that it leads to, for example, quicker recovery from clogging. The absorbance ratio (A/B) is preferably 0.9 or less, more preferably 0.85 or less. An absorbance ratio in any of these ranges is advantageous in that it leads to, for example, higher image quality and further reduced in-plane color differences.

1.3.5. Zeta Potential of the Ink

As stated, the reactivity of the water-based ink composition may be controlled by the zeta potential of the ink composition. For example, an average zeta potential of the water-based ink composition of −70.0 mV or more and −45.0 mV or less, preferably −65.0 mV or more and −50.0 mV or less, helps ensure a good balance between redispersion and aggregation properties. This is advantageous in that it makes it easier to ensure the ratio A/B is within any of the ranges indicated above.

An example of how to control the average zeta potential of the ink to make it −70 mV or more and −50 mV or less is as described above, but it may be, preferably is, controlled by the colorant. When controlling it by the colorant, an example of how is to change the dispersant for the colorant to introduce or eliminate anionic groups or to change the quantity of anionic groups already introduced therein. A negative average zeta potential of the ink increases in absolute value with increasing quantity of anionic groups in the dispersant. This is also adjusting the acid value of the dispersant; the larger the quantity of anionic groups introduced, the higher the acid value.

Examples of anionic groups include the sulfonic acid, carboxyl, and phosphoric acid groups. More than one of these groups may be present. A method for introducing any such anionic group into a dispersant is to prepare the dispersant by polymerizing a monomer having the anionic group or to adjust the amount of such a monomer. Examples of monomers having a carboxyl group include acrylic acid and methacrylic acid. Alternatively, an anionic reactive surfactant may be used in preparing the dispersant by polymerization. A polymer dispersant prepared using an anionic reactive surfactant contains the surfactant as a repeating unit.

The dispersant can be synthesized by emulsion polymerization or suspension polymerization using an addition-polymerizable monomer. An anionic reactive surfactant may be the addition-polymerizable monomer, or another addition-polymerizable monomer having an anionic water-soluble group may be used for polymerization.

Examples of monomers that can be used for polymerization include acrylates, such as methyl acrylate and ethyl acrylate, methacrylates, such as methyl methacrylate, ethyl methacrylate, and 2-ethylhexyl methacrylate, and compounds having a carbon-carbon double bond, such as vinyl acetate, ethylene, propylene, isobutylene, butadiene, styrene, methylstyrene, styrene sulfonic acid and its salts, vinyl chloride, maleic anhydride, and divinylbenzene.

When an anionic reactive surfactant is used in synthesizing a dispersant according to this embodiment, the anionic group is introduced by using the surfactant as a monomer. That is, the anionic reactive surfactant may be a compound that contains a carbon-carbon double bond, and this double bond may be used to incorporate the surfactant as a repeating unit into the dispersant.

As for measurement, the average zeta potential of the water-based ink composition can be measured by, for example, analyzing a 1-in-1000 dilution of the water-based ink composition in water using Zetasizer Nano ZS (trade name, Malvern Panalytical).

1.3.6. Ink Jet Head

In the ink attachment step in the ink jet recording method according to this embodiment, a water-based ink composition as described above is ejected from an ink jet head and attached to a recording medium.

The type of ink jet head is not critical. Several types of ink jet heads are available, such as ones that perform a recording job using piezoelectric elements and ones that perform a recording job using thermal energy, for example generated by resistor elements provided in the ink jet head as heaters. Any type of ink jet head can be used.

The ink jet head used to attach the water-based ink composition to the recording medium, moreover, may have a loop in which the water-based ink composition circulates, or may not have such a loop.

1.3.7. Variations of the Ink Attachment Step

The ink attachment step in the ink jet recording method according to this embodiment may be by making multiple main scans and sub-scans over the recording medium.

In the ink attachment step, the recording medium is heated so that the surface thereof reaches a maximum temperature of 28.0° C. or more and 45.0° C. or less where the recording medium is supported by the recording medium support and faces the ink jet head. Preferably, the maximum temperature in this context is 30.0° C. or more and 40.0° C. or less, more preferably 32.0° C. or more and 38.0° C. or less.

In the ink attachment step, preferably, in-plane variations in the surface temperature of the recording medium are 8.0° C. or less, more preferably 6.0° C. or less, even more preferably 5.0° C. or less where the recording medium is supported by the recording medium support and facing the ink jet head. These temperature variations can be controlled by, for example, the shape of the recording medium support and the position of the heat source. This helps form an image with smaller in-plane color differences.

The surface temperature of the recording medium can be measured using, for example, an infrared sensor (IR sensor). The distribution of temperatures on the surface of the recording medium can be determined by, for example, selecting twenty points (lateral ends and equally spaced points) on the recording side of the portion of the recording medium that will be supported by the recording medium support and face the ink jet head and measuring temperature at these points under recording conditions.

The ink attachment step may include an air-blow step, in which air is blown against the recording medium with the attached water-based ink composition thereon using an air-blow mechanism. That is, the ink attachment step may include moving the air present around the recording medium using an air-blow mechanism. This helps further reduce the in-plane variations in the surface temperature of the recording medium where it is supported by the recording medium support and faces the ink jet head.

The air-blow mechanism, used to move the air present around the recording medium, may deliver ambient air or may deliver warm or hot air. Adding air blowing to secondary heating is advantageous in that it helps further accelerate the drying of the solvent component(s) of the water-based ink composition. In the air-blow step, the air is blown against the recording medium preferably at a velocity of 0.5 m/sec or more, more preferably 1.0 m/sec or more, even more preferably 1.5 m/sec or more. It is still more preferred that the velocity of the air be 2.0 m/sec or more. This is advantageous in that it leads to, for example, further reduced in-plane color differences and higher image quality. The velocity of the air is preferably 5.0 m/sec or less, more preferably 4.0 m/sec or less, even more preferably 3.0 m/sec or less. This is advantageous in that it leads to, for example, quicker recovery from clogging.

In the air-blow step, furthermore, the air blown against the recording medium may be warm or ambient air. Preferably, the air has a temperature of 45.0° C. or less, more preferably 40.0° C. or less. It is even more preferred that the temperature of the air be 30° C. or less, preferably 25.0° C. or less.

This is advantageous in that it leads to, for example, further reduced in-plane color differences and higher image quality. The temperature of the air is preferably 20° C. or more, more preferably 23° C. or more, even more preferably 25° C. or more. This is advantageous in that it leads to, for example, quicker recovery from clogging. The velocity and temperature of the air are those measured above the recording surface of the recording medium, substantially at the ink jet head.

2. Ink Jet Recording Apparatus

An ink jet recording apparatus according to this embodiment is configured to perform the ink jet recording method described above.

2.1. Outline of the Ink Jet Recording Apparatus

The following describes an example of an ink jet recording apparatus suitable for use with water-based ink compositions according to an embodiment with reference to drawings. In the drawings referenced in the following description, the scale and relative dimensions of elements may vary so that each element is recognizable.

Figure 2:
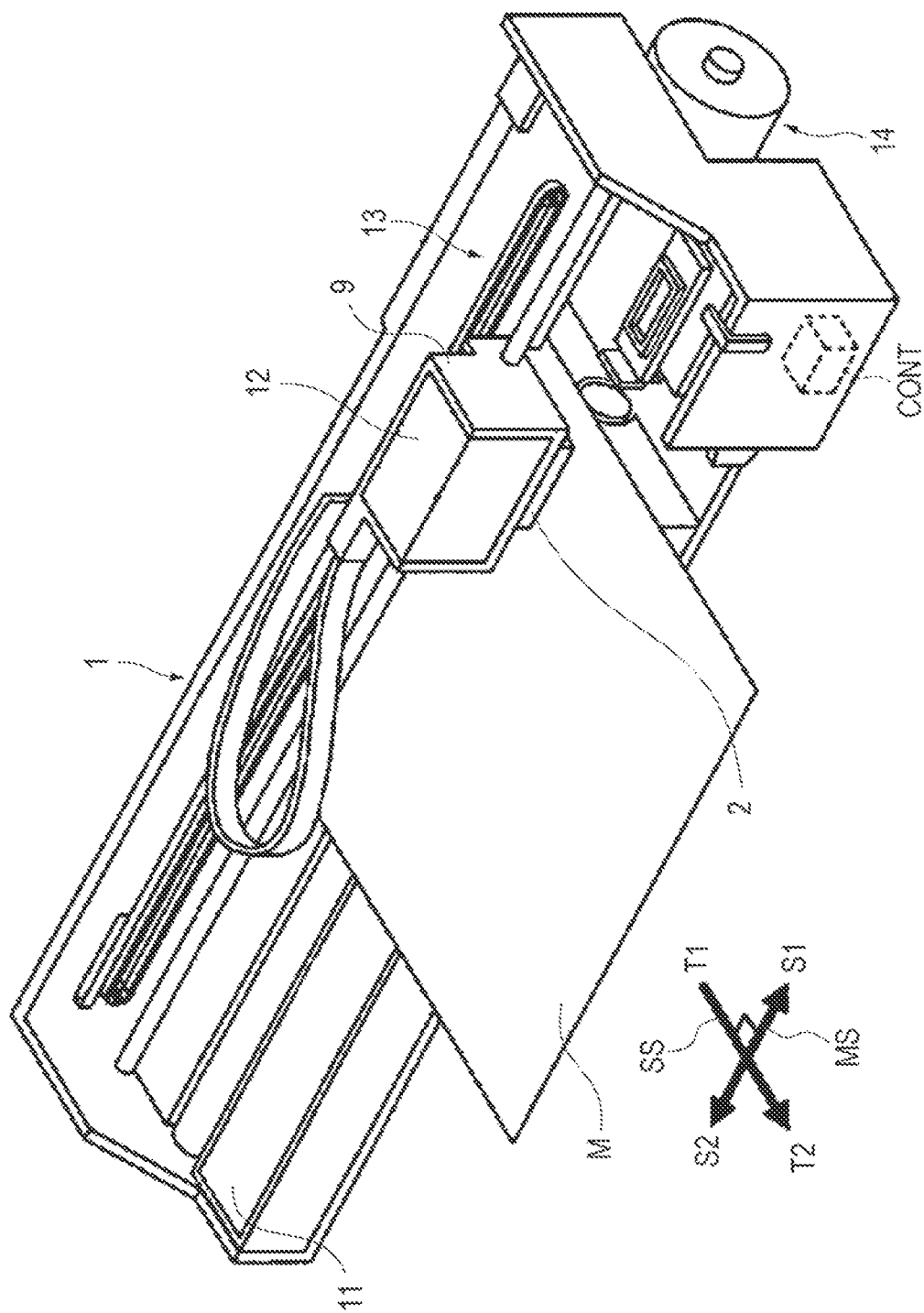
FIG. 2 is an outline illustration of the carriage and related components of an example of an ink jet recording apparatus according to an embodiment.

FIG. 1 is an outline cross-sectional diagram schematically illustrating an ink jet recording apparatus 1. FIG. 2 is a perspective view of the carriage and related components of the ink jet recording apparatus 1 in FIG. 1, illustrating an exemplary configuration. As illustrated in FIGS. 1 and 2, the ink jet recording apparatus 1 includes an ink jet head 2, a heater 3, a platen heater 4, an afterheater 5, a fan 6, a preheater 7, an aeration fan 8, a carriage 9, a platen 11, a carriage-moving mechanism 13, a transporter 14, and a control section CONT. The ink jet recording apparatus 1 has a platen 11 that serves as a recording medium support and a platen heater 4 that heats the platen 11 and thereby serves as a heating mechanism. By the control section CONT, illustrated in FIG. 2, the overall operation of the ink jet recording apparatus 1 is controlled. The platen 11 is an example of a recording medium support, and the platen heater 4 is an example of a heating mechanism.

The ink jet head 2 is configured to perform recording on a recording medium M by ejecting at least one treatment liquid and at least one water-based ink composition through its nozzles and attaching them to the recording medium M. In the illustrated example, the ink jet head 2 is a serial ink jet head: it attaches the treatment liquid and water-based ink composition to the recording medium M by scanning relative to the recording medium M in a main scanning direction multiple times. The ink jet head 2 is on the carriage 9, illustrated in FIG. 2. As the carriage-moving mechanism 13 forces the carriage 9 to move in the direction of medium width or along the width of the recording medium M, the ink jet head 2 scans relative to the recording medium M in the main scanning direction multiple times. The direction of medium width is the main scanning direction, i.e., the direction in which the ink jet head 2 scans. A scan in the main scanning direction is also referred to as a main scan.

The main scanning direction, moreover, is the direction in which the carriage 9 moves with the ink jet head 2 thereon. In FIG. 1, the main scanning direction is the direction that crosses a sub-scanning direction, indicated by arrow SS, which is the direction of transport of the recording medium M. In FIG. 2, the direction along the width of the recording medium M, i.e., direction S1-S2, is the main scanning direction MS, and the direction of T1→T2 is the sub-scanning direction SS. During a scan, the ink jet head 2 scans in the main scanning direction, i.e., in either of the directions of arrows S1 and S2. A main scan, made by the ink jet head 2, and a sub-scan, which is the transport of the recording medium M, are repeated to perform recording on the recording medium M. That is, the treatment liquid and water-based ink composition attachment steps are carried out through multiple main scans as movements of the ink jet head 2 in the main scanning direction and multiple sub-scans as movements of the recording medium M in the sub-scanning direction, which crosses the main scanning direction.

A cartridge assembly 12, which supplies the treatment liquid and water-based ink composition to the ink jet head 2, includes multiple independent cartridges. The cartridge assembly 12 has been detachably attached to the carriage 9 carrying the ink jet head 2 thereon. Each cartridge contains a different kind of water-based ink composition or treatment liquid, and the water-based ink composition and treatment liquid are supplied from the cartridge assembly 12 to the nozzles. Although the cartridge assembly 12 in the illustrated example is on the carriage 9, this is not the only possible configuration. The cartridge assembly 12 may be somewhere other than the carriage 9, and the ink and treatment liquid may be supplied to the nozzles through feed tubes not illustrated.

The ejection from the ink jet head 2 can be in any known mode. The illustrated example employs a mode in which vibrations of piezoelectric elements are used to eject droplets, i.e., an ejection mode in which mechanical deformation of electrostrictive elements is used to form ink droplets.

The ink jet recording apparatus 1 may include a drying mechanism that performs a drying step for drying the recording medium M while the water-based ink composition is ejected from the ink jet head 2 and attached to the recording medium (primary heating). Heat or air-blow drying can be used. The drying mechanism can be, for example, a conduction, air-blow, or radiation drying mechanism. A conduction drying mechanism comes into contact with the recording medium M and conducts heat to the recording medium M. An example is the platen heater 4 illustrated in the drawings. An air-blow drying mechanism delivers ambient or warm air to the recording medium M to cause the water-based ink composition, for example, to dry. An example is the aeration fan 8. A radiation drying mechanism irradiates the recording medium M with heat radiation to heat the recording medium M. An example is using an afterheater as the heater 3 and emitting infrared light from it. One such drying mechanism may be used alone, or a combination may be used.

When a drying step (primary heating) is performed to dry the recording medium M, the heater 3 and the aeration fan 8, for example, can be used. By using the heater 3, the recording medium M can be heated from the ink jet head 2 side by radiation heating through irradiation with infrared light. This often causes the ink jet head 2, too, to be heated, but helps elevate the temperature of the recording medium M with less influence of its thickness than with heating from the back of the recording medium M, for example using the platen heater 4.

The ink jet recording apparatus 1 may include an aeration fan 8 that delivers air, as an air-blow mechanism, to the recording medium M with the attached water-based ink composition thereon in the ink attachment step. The aeration fan 8 is configured to blow warm air or air at the ambient temperature against the recording medium M and thereby to dry the treatment liquid and water-based ink composition on the recording medium M. When the aeration fan 8 is used, the air is blown against the recording medium M at a velocity of 1.0 m/sec or more for example, preferably 1.5 m/sec or more. The air blown against the recording medium M has a temperature of 45.0° C. or less, preferably 40.0° C. or less, more preferably 35.0° C. or less.

The platen heater 4 is positioned opposite the ink jet head 2 and is configured to heat the recording medium M via the platen 11 interposed therebetween to accelerate the drying of the water-based ink composition ejected from the ink jet head 2 and attached to the recording medium M. The platen heater 4 is configured to heat the recording medium M by conduction heating, is used in the ink jet recording method described above, and is controlled to make the surface temperature of the recording medium M 28.0° C. or more and 45.0° C. or less. Although not illustrated, a line ink jet recording apparatus would have an underheater as an equivalent to the platen heater 4.

In a drying step performed using a drying mechanism in the ink attachment step, the recording medium M is heated preferably to a surface temperature of 45.0° C. or less, more preferably 40.0° C. or less, even more preferably 38.0° C. or less, in particular 35.0° C. or less for the upper limit. As for the lower limit, the recording medium M is heated preferably to a surface temperature of 25.0° C. or more, more preferably 28.0° C. or more, even more preferably 30.0° C. or more, in particular 32.0° C. or more. This helps limit the drying and chemical alteration of the water-based ink composition while in the ink jet head 2, thereby helping prevent the deposition of the water-based ink composition and any resin therein on the inner walls of the ink jet head 2. Heating the recording medium M to such a surface temperature also encourages early fixation of the treatment liquid and water-based ink composition on the recording medium M, thereby helping reduce the transfer of the ink to the back of the recording medium M. As a result, image quality is improved.

The ink jet recording apparatus 1 according to this embodiment may include an afterheater 5 as a heating device with which a heating step can be performed after the ink attachment step in which the recording medium M is heated to dry and fix the ink (secondary heating).

The afterheater 5, used in a postheating step, is a heater that dries and solidifies the water-based ink composition attached to the recording medium M, i.e., a heater for secondary heating or secondary drying. The afterheater 5 can be used in a postheating step. With the afterheater 5 heating the recording medium M with a recorded image thereon, the water, for example, in the water-based ink composition evaporates away more quickly than without it. Any resin contained in the water-based ink composition forms ink film, and the ink film becomes firmly fixed on or adheres strongly to the recording medium M. With this superior good film formation capability, the ink jet recording apparatus 1 produces a good and high-quality image in a short time.

Preferably, the afterheater 5 heats the recording medium M to a surface temperature of 120.0° C. or less, more preferably 100.0° C. or less, even more preferably 90.0° C. or less for the upper limit. As for the lower limit, the recording medium M is heated preferably to a surface temperature of 60.0° C. or more, more preferably 70.0° C. or more, even more preferably 80.0° C. or more. A surface temperature in any of these ranges ensures a high-quality image will be obtained in a short time. A line ink jet recording apparatus would also have an afterheater equivalent to the afterheater 5. The afterheater can be, for example, a carbon heater.

The ink jet recording apparatus 1 may have a fan 6. The fan 6 is an air-blow mechanism and is configured to move the air present around the recording medium M. Using the fan 6 helps cool, additionally dry, or additional heat the water-based ink composition attached to the recording medium M after or during a heating step (irradiation with infrared light). The gas delivered from the fan 6, therefore, may be agas at room temperature or may be warm air.

The ink jet recording apparatus 1 may include a preheater 7 that heats the recording medium M preliminarily, before the attachment of the water-based ink composition to the recording medium M. The ink jet recording apparatus 1, moreover, may include an aeration fan 8 so that the treatment liquid and water-based ink composition attached to the recording medium M will dry more efficiently. A line ink jet recording apparatus, too, could have a preheater 7.

Under the carriage 9 are a platen 11 that supports the recording medium M, a carriage-moving mechanism 13 that moves the carriage 9 relative to the recording medium M, and a transporter 14 that is a roller that transports the recording medium M in the sub-scanning direction. The operation of the carriage-moving mechanism 13 and the transporter 14 is controlled by the control section CONT.

Figure 3:
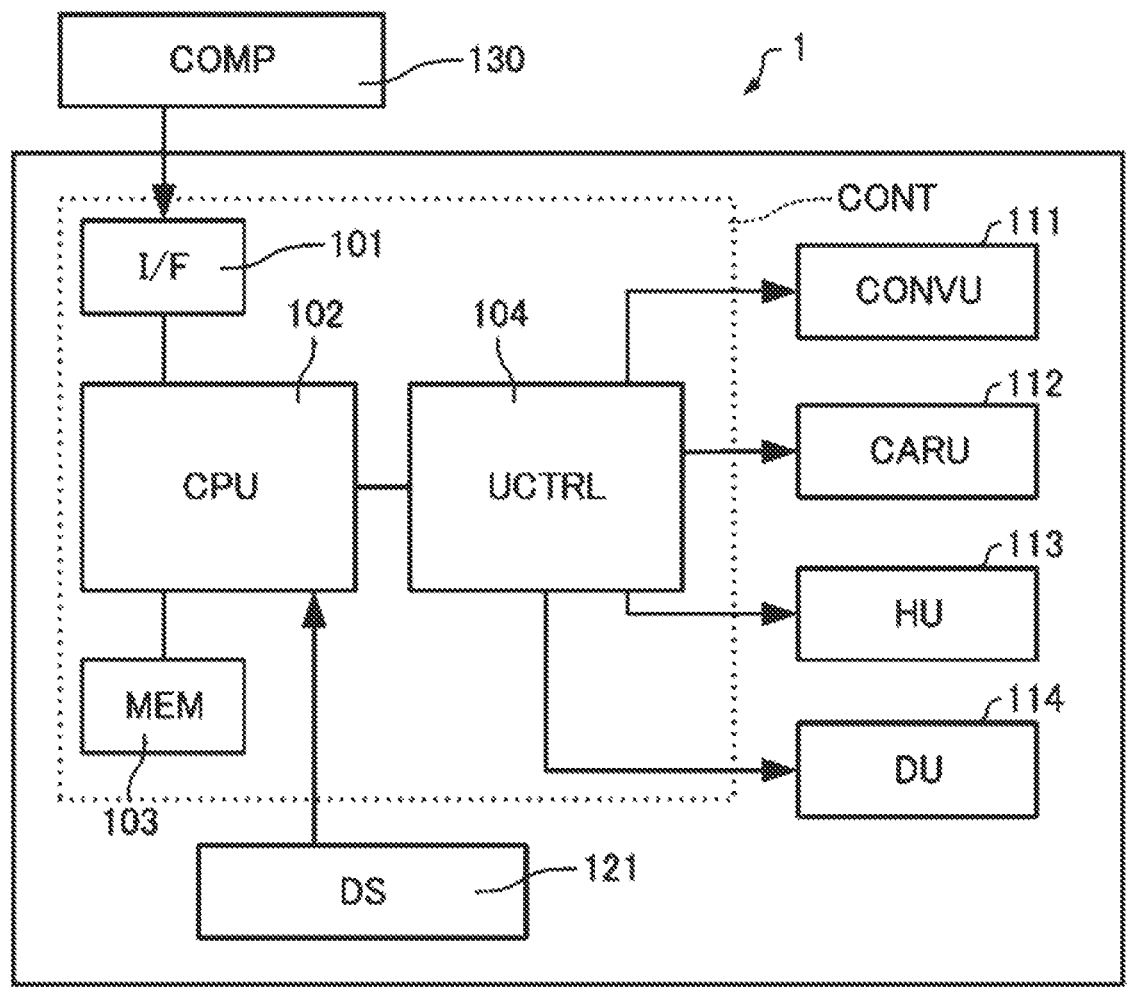
FIG. 3 is a block diagram for an example of an ink jet recording apparatus according to an embodiment.

FIG. 3 is a functional block diagram for the ink jet recording apparatus 1. The control section CONT is a control unit for controlling the ink jet recording apparatus 1. The interface 101 (I/F) is for exchanging data between a computer 130 (COMP) and the ink jet recording apparatus 1. The CPU 102 is a processing unit for overall control of the ink jet recording apparatus 1. The memory 103 (MEM) is for, for example, storing programs and providing workspace for the CPU 102. The CPU 102 controls each unit via a unit control circuit 104 (UCTRL). A set of detectors 121 (DS) monitor the internal status of the ink jet recording apparatus 1. Based on detected events, the control section CONT controls each unit.

The transport unit 111 (CONVU) is a unit that controls sub-scans (transport) in an ink jet recording job, specifically the direction and rate of transport of the recording medium M. To be more specific, the transport unit 111 controls the direction and rate of transport of the recording medium M by controlling the direction and rate of rotation of a motor-driven transport roller.

The carriage unit 112 (CARU) is a unit that controls main scans (passes) in an ink jet recording job, or specifically a unit that moves the ink jet head 2 back and forth in the main scanning direction. The carriage unit 112 includes a carriage 9 for the ink jet head 2 and a carriage-moving mechanism 13 for moving the carriage 9 back and forth.

The head unit 113 (HU) is a unit that controls the volumes ejected from the nozzles of the ink jet head 2 of the treatment liquid and water-based ink composition. For example, when the nozzles of the ink jet head 2 are ones driven by piezoelectric elements, the head unit 113 controls the operation of the piezoelectric element in each nozzle. By the head unit 113, parameters such as the timing of attachment and size of each droplet of the treatment liquid and water-based ink composition are controlled. The carriage unit 112 and the head unit 113, moreover, together control the volumes of the treatment liquid and water-based ink composition attached per scan.

The drying unit 114 (DU) controls the temperature of heaters, such as the heater 3, preheater 7, platen heater 4, and afterheater 5.

This ink jet recording apparatus 1 alternates the operation of moving the carriage 9, with the ink jet head 2 thereon, in the main scanning direction and the transport operation (sub-scans). During each pass, the control section CONT controls the carriage unit 112 to move the ink jet head 2 in the main scanning direction, and also controls the head unit 113 to eject droplets of the treatment liquid and water-based ink composition from predetermined nozzle orifices of the ink jet head 2 and attach the ejected droplets to the recording medium M. The control section CONT also controls the transport unit 111 to transport the recording medium M in the direction of transport by a predetermined distance (feed) during the transport operation.

As the ink jet recording apparatus 1 repeats a main scan (pass) and a sub-scan (transport operation), a recording region is transported little by little with attached multiple droplets thereon. Then the afterheater 5 is used to dry the droplets attached to the recording medium M, finishing an image. The finished recording may then be rolled by a rolling mechanism or transported on a flatbed mechanism.

The foregoing is a description of a serial recording apparatus, which has a serial ink jet head and performs serial recording. The ink jet head 2, however, may alternatively be a line head. An ink jet head for a line recording apparatus has nozzles arranged over a length equal to or longer than the width of the recording medium M used therewith and attaches water-based ink composition(s) to the recording medium M in one pass.

Figure 4:
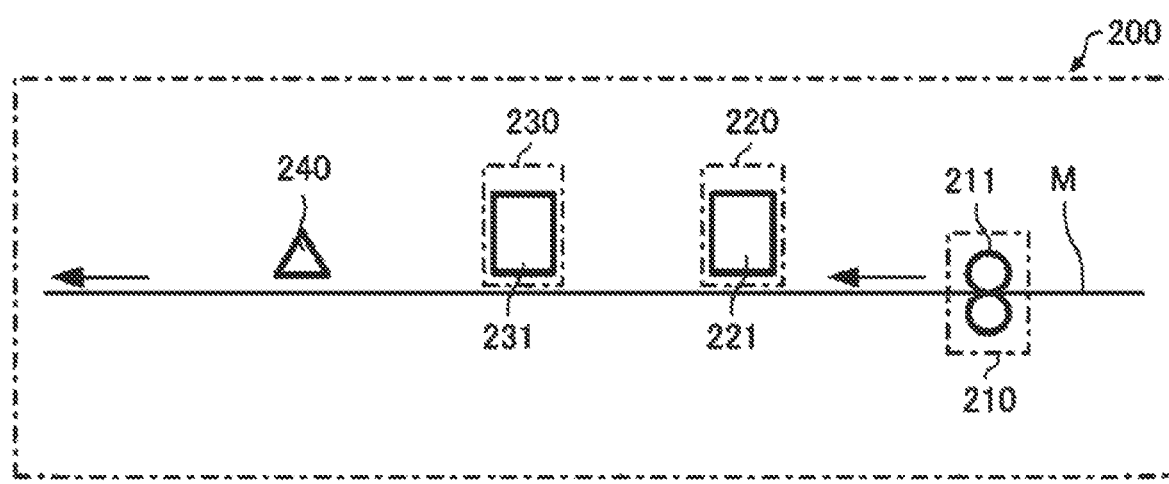
FIG. 4 is an outline cross-sectional diagram schematically illustrating part of a line recording apparatus.

FIG. 4 is an outline cross-sectional diagram schematically illustrating part of a line recording apparatus, which has a line head (line ink jet head) and performs line recording. The part 200 of the recording apparatus includes a treatment liquid applicator 220, which includes an ink jet head 221 for a treatment liquid; an ink composition applicator 230, which includes an ink jet head 231 for an ink composition; a recording medium transporter 210, which includes transport rollers 211 that transport a recording medium M; and at least one postheating device 240, with which the recording medium M is subjected to a heating step (secondary heating). In this embodiment, the postheating device 240 is an afterheater and/or a carbon heater so that the image can be irradiated with infrared light. The ink jet heads 231 and 221 are line ink jet heads, which have lines of nozzles extending in the direction of width of the recording medium M, or in the front-back direction in the drawing.

A line recording apparatus transports the recording medium M in the direction of transport, indicated by arrows in FIG. 4, to change the relative positions of the ink jet heads 231 and 221 and the recording medium M, and at the same time ejects a treatment liquid and an ink composition from the ink jet heads 231 and 221 and attaches them to the recording medium M. This is referred to as a scan, and a scan is also referred to as a main scan or a pass. Line recording is a one-pass recording method, in which a recording job is performed by attaching at least one treatment liquid and at least one ink composition to a transported recording medium M in one pass using ink jet heads 231 and 221.

A line recording apparatus includes a line ink jet head and performs line recording, but otherwise it can be the same as the serial ink jet recording apparatus 1 described above. A line recording apparatus may include a drying device with which a drying step is performed. For example, a line recording apparatus may have drying devices like the aeration fan 8 and heater 3, which are above the ink jet head 2 in FIG. 1, above the ink jet heads 231 and 221 in FIG. 4 and may also have an underheater or any other drying device corresponding to the platen heater 4, which is under the ink jet head 2 in FIG. 1, under the ink jet heads 231 and 221 in FIG. 4.

2.2. Details of the Recording Medium Support

Figure 5:
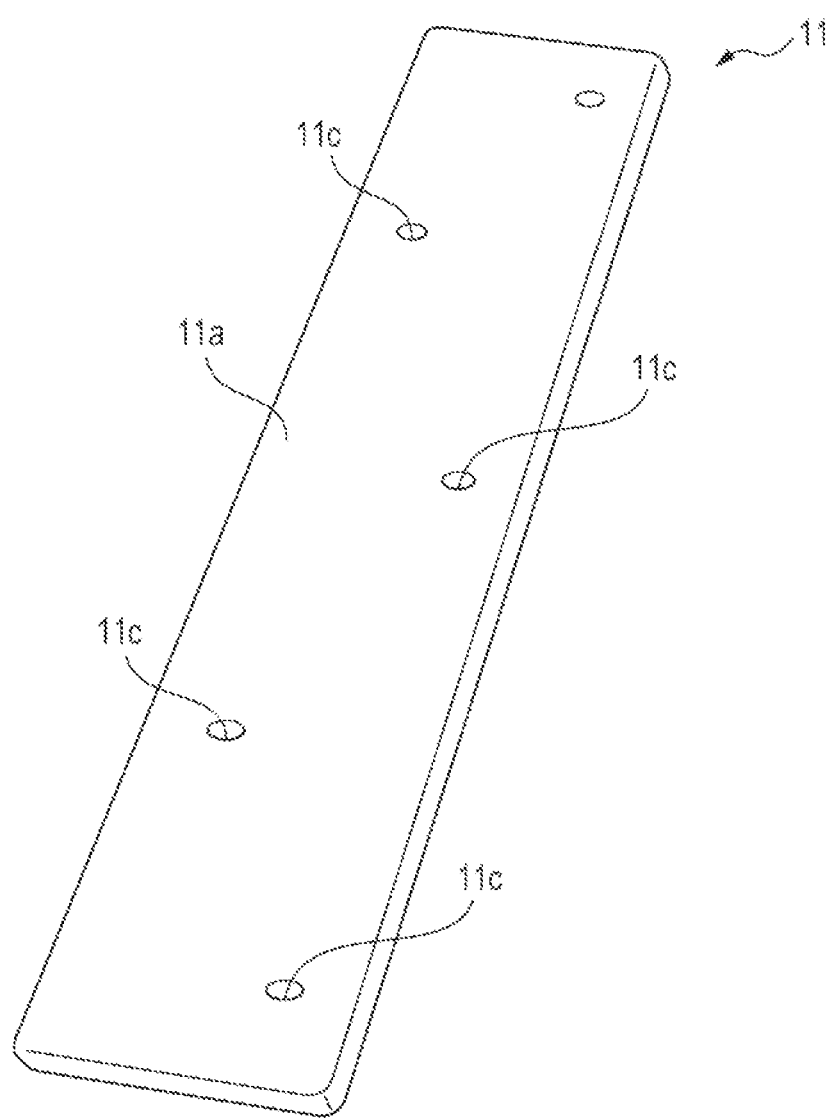
FIG. 5 is a perspective diagram schematically illustrating an example of a recording medium support that has a flat support surface.

FIG. 5 is a perspective diagram schematically illustrating an example of a recording medium support (platen) as a component of the ink jet recording apparatus according to this embodiment. The recording medium support has a flat support surface. In the above example of the ink jet recording apparatus 1, the recording medium support is heated by heating a platen 11, which is the recording medium support, from the side opposite its support surface 11a using a heating mechanism.

In addition, the platen 11 as the recording medium support has a flat support surface 11a for supporting the recording medium M as illustrated in FIG. 5. As already mentioned, it is preferred that while supporting the recording medium M, the support surface 11a touch the recording medium M in 90.0% or more by area of its portion where it supports the recording medium M and faces the ink jet head during a recording job. The ink jet head in this context represents its portion where it has nozzles for ink ejection and includes the span from the upstream to downstream ends in the direction of transport of the recording medium M. The percentage of the area of the support surface 11a touching the recording medium M is defined as the contact area, and that of the area of the supports surface 11a not touching the recording medium M is defined as the non-contact area.

More preferably, the contact area is 95.0% or more, even more preferably 98.0% or more, still more preferably 99.0% or more. As for the upper limit, the contact area is 100% or less, may be 99.5% or less, or may be 99.0% or less.

In the example illustrated in FIG. 5, the support surface 11a of the platen 11 has vacuum holes 11c through which the recording medium M (not illustrated) is attracted by suction to the support surface 11a. Below the vacuum holes 11c is an aspirator (not illustrated). The vacuum holes 11c are optional, but the total area of the vacuum holes 11c, when present, is less than 10%, preferably 7% or less, more preferably 5% or less of the area of the aforementioned portion of the support surface 11a. This ensures a broad area of the support surface 11a of the platen 11 will touch the recording medium M supported thereon, thereby helping the platen 11 conduct heat to the recording medium M evenly. Lifting of the recording medium M from the support surface 11a is also prevented.

As mentioned earlier herein, a flat support surface is, for example, one that has no projections and depressions for discontinuous support of the recording medium. The support surface, however, may be partially apart from the recording medium unless this causes excessive unevenness in the temperature of the recording medium. Examples other than vacuum holes include joints and gaps that develop during the formation of the support surface. The aforementioned non-contact area of the support surface is less than 10%, preferably less than 7%, more preferably less than 5%, even more preferably less than 3%, less than 2%, or less than 1%. A non-contact area in any of these ranges is advantageous in that it leads to further reduced color differences. As for the lower limit, the non-contact area is 0% or more and may be 0.5% or more, although in a non-limiting sense.

Preferably, these portions of the support surface 11a of the support not touching the recording medium M are dispersed on the support surface 11a. Each continuous portion preferably measures 3 cm or less, more preferably 2 cm or less, even more preferably 1 cm or less, in particular 0.5 cm or less in the main scanning direction. This is advantageous in that temperature unevenness becomes smaller by virtue of the dispersion of small-sized non-contact portions, leading to further reduced color differences. There is no lower limit, but preferably each continuous portion measures 0.1 cm or more, more preferably 0.2 mm or more in the main scanning direction.

The recording medium M passes over the platen 11 with the treatment liquid and the water-based ink composition mixed thereon, and the water-based ink composition reacts slowly with the treatment liquid due to the absorbance ratio (A/B) being 0.5 or more and 0.95 or less. The above configuration, however, prevents the image from drying at different rates from part to part of the recording medium M, thereby reducing area dependence of aggregation speed. It therefore becomes less likely that the degree of aggregation, or in other words color strength, varies between portions in the same color. As a result, the image is formed with smaller in-plane color differences.

In this regard, it is preferred that the platen 11 measure longer than the recording medium M in the direction perpendicular to the direction of transport of the recording medium M. Preferably, the support surface 11a of the platen 11 is formed by an element having a thickness of 2.0 mm or more and 10.0 mm or less, more preferably 3.0 mm or more and 10.0 mm or less, even more preferably 5.0 mm or more and 10.0 mm or less. This element, forming the support surface 11a of the platen 11, is the outermost component, or the component closest to the recording medium M, of the platen 11, has a support surface, and is shaped like a plate. This element can be made of, for example, metal or plastic, but preferably is made of metal so that it conducts heat well. In the example illustrated in FIG. 5, the platen 11 itself is this element. Any metal can be used, but examples include iron, aluminum, stainless steel, copper, and alloys containing one or more of these.

An element having a thickness equal to or larger than the lower extremities of the above ranges is advantageous in that it leads to further reduced in-plane color differences, partly because the large heat capacity of the element helps, for example, reduce the variations in the temperature reached between printed and unprinted areas of the recording medium M. An element having a thickness equal to or smaller than the higher extremities of the ranges is advantageous in that with such an element, it is easier to heat the platen 11 with the heating mechanism.

The following describes a second aspect of the present disclosure.

The following describes embodiments of this aspect of the disclosure (hereinafter each referred to as "an embodiment") in detail, referring to drawings as necessary. The second aspect of the disclosure is not limited to these embodiments, and various modifications can be made within its gist. Like elements are referred to by like reference signs in the drawings, and each element is described only once. Relative positions, such as above and below and left and right, are based on the drawing(s) unless stated otherwise. The relative dimensions in the drawings are not necessarily to scale.

1. Recording Method

A recording method according to an embodiment is one in which the recording medium is a synthetic fiber-containing sheet having a raised pattern on its surface. The method includes an ink attachment step, in which a water-based ink composition is ejected from an ink jet head and attached to the recording medium. In the recording method according to this embodiment, the ink attachment step is performed using a water-based ink composition that contains a pigment, water, and at least one organic solvent. The pigment represents 5.0% by mass or less of the total amount of the water-based ink composition, and the organic solvent includes at least one solvent selected from glycol ethers and C5 or longer alkanediols (hereinafter collectively referred to as "specified organic solvents"). The total percentage of specified organic solvents is 1.0% by mass or more of the total amount of the water-based ink composition.

Recording by ink jet technology has been applied to a wide variety of recording media. Against this background, researchers are exploring using wallpaper as a recording medium and producing records on it by ink jet technology. For example, wallpapers such as fleece wallpaper are suitable for recording with water-based ink compositions because they can be attached to a wall with a water-based adhesive and generally do not swell or crease upon contact with water or similar liquids. Such a wallpaper does not always have a flat and smooth recording surface like ordinary paper. Variations having an uneven surface, such as an embossed surface, are favored for aesthetic reasons.

Attaching an ink composition to a recording medium having a raised pattern, however, often results in the ink composition collecting in sunken areas. This prevents the intended recording from being achieved, for example because the portions where the ink collects into pools (hereinafter also referred to as "ink puddles") are colored more heavily than the rest. One, but not the only, reason is that the ink composition attached to the raised pattern is forced by gravitation to flow down on the surface of the pattern before penetrating into or drying on the recording medium. Drying the recording medium in the presence of such localized puddles of the ink composition, moreover, often causes the ink composition there to delaminate, posing the problem of degraded wet abrasion resistance of the recording.

Fleece for wallpaper or similar applications, furthermore, is generally a sheet containing a synthetic fiber. Fleece wallpaper therefore poorly absorbs water-based ink compositions and often suffers the aforementioned problem of the collection of an ink composition compared with sheets containing natural fiber, such as Japanese traditional washi paper.

In this embodiment, the penetration of a water-based ink composition into synthetic fiber-containing sheets is improved by adjusting the pigment content of and the percentage of specified organic solvents in the ink composition. This makes the water-based ink composition penetrate uniformly into raised and sunken areas, for example of wallpaper, thereby helping form a better solid image on a synthetic fiber-containing sheet having a raised pattern on its surface while reducing ink puddles in sunken areas. Reducing ink puddles also helps improve the wet abrasion resistance of the recording. In this embodiment, therefore, it is preferred to attach the ink composition to at least the portion of the recording medium where it has the raised pattern. The following describes each element and step in detail.

1.1. Recording Medium

Before the individual steps, recording media intended in the recording method according to this embodiment are described. The recording method according to this embodiment is for any recording medium that includes a synthetic fiber-containing sheet having a raised pattern on its surface.

The synthetic fiber-containing sheet can be of any kind as long as it contains a synthetic fiber. The sheet may be totally of a synthetic fiber or may contain synthetic and natural fibers. A sheet that contains synthetic and natural fibers, i.e., a sheet made as a mixture of natural and synthetic fibers, is particularly preferred. By virtue of containing a synthetic fiber, the sheet is highly durable in use as a recording medium and does not easily swell even after absorbing water. The sheet, on the other hand, does not absorb much ink because of the presence of the synthetic fiber and therefore benefits from this embodiment. A sheet made as a mixture of natural and synthetic fibers, moreover, can be easily processed to have a raised pattern, is better in ink absorption, but maintains the aforementioned durability and resistance to swelling.

Any kind of synthetic fiber can be used, but examples include polyester fibers, such as polyethylene terephthalate, polybutylene terephthalate, polytrimethylene terephthalate, and copolymerized polyesters; polyolefin fibers, such as linear low-density polyethylene, low-density polyethylene, high-density polyethylene, and polypropylene; polyamide fibers, such as nylon 6, nylon 66, nylon 610, and nylon 46; acrylic fibers, such as polyacrylonitrile; and polyurethane fibers. Semi-synthetic fibers are also included, such as acetate, triacetate, and promix. Polyester fibers are particularly preferred.

A natural fiber can be of any kind, but examples include cellulose fibers, such as wood pulp fibers, non-wood pulp fibers, cotton, and hemp; and wool and silk. Cellulose fibers are particularly preferred.

Any kind of synthetic fiber-containing sheet can be used as long as it is a sheet of fibers. It can be woven fabric, nonwoven fabric, or a textile. Nonwoven fabric is particularly preferred. In this embodiment, a nonwoven fabric for wallpaper applications made as a mixture of natural and synthetic fibers is also referred to as fleece wallpaper.

The recording medium in this embodiment can be of any type that includes a synthetic fiber-containing sheet having a raised pattern on its surface. It may be a synthetic fiber-containing sheet alone or may be a multilayer medium that has a synthetic fiber-containing sheet on the recording side and an extra layer on the other side. Examples of extra layers include a support layer that reinforces the synthetic fiber-containing sheet and, when the recording medium is used as wallpaper, an adhesive layer and a release layer that protects the adhesive surface of the adhesive layer. The recording medium in this embodiment may include the synthetic fiber-containing sheet as part of its surface.

The raised pattern the synthetic fiber-containing sheet has can be of any type, but an example is irregularities on the surface visible to the human eye. The raised pattern can have any shape, such as a repeated pattern, e.g., stripes, a grid, or a motif, or an irregular pattern. The synthetic fiber-containing sheet does not need to have the pattern throughout its surface; markings and other patterns for indication purposes on a particular point of the sheet are also raised patterns according to this embodiment.

Such a raised pattern can be made by any method, but an example is to apply pressure to the surface of the sheet (pressing), for example by embossing. Methods other than pressing can also be used, such as forming a raised pattern of resin by attaching microparticles of resin to portions of the surface of the sheet, forming a raised repeated pattern during the production of the sheet, etc.

Such a recording medium generally improves the wet abrasion resistance of the resulting recording by virtue of its swell-proof nature. The resulting recording, moreover, adheres well to substrates when attached using a water-based adhesive agent.

Preferably, the synthetic fiber-containing sheet has a grammage of 100 g/m$^2$ or more. The grammage is preferably 300 g/m$^2$ or less, more preferably from 120 to 300 g/m$^2$, even more preferably from 120 to 250 g/m$^2$, in particular from 150 to 230 g/m$^2$. Synthetic fiber-containing sheet having a grammage of 100 g/m$^2$ or more tend to be better in the absorption of the water-based ink composition and therefore in the prevention of ink puddles.

1.2. Ink Attachment Step

The ink attachment step is a step in which a water-based ink composition is ejected from an ink jet head and attached to at least the raised pattern on the recording medium. The ink jet head, which ejects the water-based ink composition toward the recording medium to perform recording, has a cavity in which the ink composition to be ejected is contained, an ejection driver that forces the water-based ink composition to eject, and nozzles through which the water-based ink composition is ejected out of the head. The ejection driver can be formed by, for example, electromechanical transducers, which change the volume of the cavity through mechanical deformation, such as piezoelectric elements, or electrothermal transducers, which heat the ink and thereby produce bubbles therein as a driving force for ejection.

The ink jet head, moreover, may be a serial head or line head. Serial recording, which uses a serial head, involves multiple main scans. In each main scan, the head moves in a main scanning direction (S1-S2) while ejecting the water-based ink composition to adhere to the recording medium (see FIG. 6). The main scanning direction crosses a sub-scanning direction (T1-T2), in which the recording medium goes, and two or more main scans are made over the same region of the recording medium to record an image thereon. In line recording, in which a line head is used, the head is stationary. The recording medium moves in a scanning direction (direction of the length or transport of the recording medium), and the head ejects ink droplets through its nozzle openings in tandem with this movement to record an image on the recording medium.

Preferably, the recording method in this embodiment is implemented using a serial head, or as a method of serial recording, in particular. This tends to further improve the quality of a solid image on the resulting recording.

Preferably, in the ink attachment step, the maximum amount of attached water-based ink composition is 20 mg/inch$^2$ or less. The maximum amount of attached water-based ink composition is preferably 2 mg/inch$^2$ or more, more preferably from 5 to 18 mg/inch$^2$, even more preferably from 10 to 14 mg/inch$^2$. A maximum amount of attached water-based ink composition of 20 mg/inch$^2$ or less generally leads to more effective prevention of ink puddles and further improved wet abrasion resistance. A maximum amount of attached water-based ink composition of 2 mg/inch$^2$ or more generally leads to improved optical density and completeness of the resulting recording. The "maximum amount of attached water-based ink composition" refers to that in the region in which the amount of attached ink per unit area is larger than in any other region, assuming that the recording method attaches different amounts of ink to different regions of the recording medium. A region in this context only needs to have an area large enough that the amount of attached ink therein can be determined, e.g., a region measuring approximately 1×1 mm.

1.2.1. Water-Based Ink Composition

The water-based ink composition according to this embodiment contains a pigment, water, and at least one organic solvent. Resin, wax, a defoamer, and/or a surfactant may optionally be contained. Of particular note is that the organic solvent includes at least one solvent selected from "specified organic solvents," which are glycol ethers and C5 or longer alkanediols. Organic solvents that are not specified organic solvents (hereinafter also referred to as "extra organic solvents") may optionally be contained. An organic solvent that can be a specified or extra one is simply referred to as an "organic solvent." In this embodiment, being "water-based" means that the composition contains water as its primary solvent component. The following describes the individual components in detail.

1.2.1.1. Pigment

Any kind of pigment can be used, but examples include inorganic pigments, such as carbon black (C.I. Pigment Black 7) pigments, e.g., furnace black, lamp black, acetylene black, and channel black, iron oxide, and titanium oxide; and organic pigments, such as quinacridone pigments, quinacridone quinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, magenta pigments, and azo pigments. One pigment alone or a combination of two or more may be used.

The pigment content is 5.0% by mass or less, preferably from 1.0% to 5.0% by mass, more preferably from 2.5% to 5.0% by mass of the total amount of the water-based ink composition. A pigment content of 5.0% by mass or less leads to more effective prevention of ink puddles and further improved wet abrasion resistance. When the pigment content is 1.0% by mass or more, the optical density of the resulting recording tends to be further improved. The pigment content is on a solids basis; when the water-based ink composition contains the pigment in liquid dispersion form, the pigment content is based on the amount of solid pigment.

1.2.1.2 Water

Preferably, the water is present in an amount of 40% by mass or more, more preferably from 45% to 98% by mass, even more preferably from 55% to 85% by mass, still more preferably from 60% to 80% by mass, further preferably from 65% to 75% by mass of the total amount of the water-based ink composition. Using an amount of water in any of these ranges ensures that the ink composition does not cause the recording medium to swell and gives a recording superior in wet abrasion resistance.

1.2.1.3. Organic Solvent(s)

The water-based ink composition according to this embodiment contains at least one specified organic solvent, or at least one solvent selected from alkyl ethers of polyhydric alcohols (glycol ethers) and C5 or longer alkanediols. By virtue of containing a certain amount of specified organic solvent(s), the water-based ink composition is even better than without it in penetration into synthetic fiber-containing sheets. Even when attached to a raised pattern, therefore, the water-based ink composition quickly penetrates where it adheres. This helps prevent ink puddles, thereby further improving the quality of a solid image on the resulting recording. The wet abrasion resistance of the resulting recording is also further improved.

A glycol ether is an ether of an alkylene glycol or of a condensate formed by intermolecular condensation between hydroxyl groups of an alkylene glycol. For a condensate, the number of condensations is preferably from 2 to 6, more preferably from 2 to 4. Preferably, the alkylene group in an alkylene glycol or its condensate is a C1 to C5, more preferably C2 to C4, alkylene. Preferably, the ether as a component of the glycol ether is an alkyl ether. The alkyl group in the alkyl ether is preferably a C1 to C5, more preferably C2 to C4, alkyl. Both glycol monoethers and glycol diethers can be used, and glycol monoethers are preferred.

Any kind of glycol ether can be used, but examples include glycol monoethers such as ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxybutanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, propylene glycol monobutyl ether, dipropylene glycol monobutyl ether, and tetraethylene glycol monobutyl ether; and glycol diethers such as diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, and tripropylene glycol dimethyl ether. One glycol ether alone or a combination of two or more may be used.

In particular, glycol monoethers are preferred. Glycol monoethers having three to five terminal carbon atoms in the ether group are more preferred, and triethylene glycol monobutyl ether and tetraethylene glycol monobutyl ether are even more preferred. Using such a glycol ether generally leads to more effective prevention of ink puddles and further improved wet abrasion resistance.

For C5 or longer alkanediols, any such diol can be used. Examples include 1,2-pentanediol, 1,5-pentanediol, 1,2-hexanediol, 1,6-hexanediol, 1,2-heptanediol, 2-ethyl-1,3-hexanediol, 2,2-dimethyl-1,3-propanediol, 2,2-dimethyl-1,3-hexanediol, and 3-methyl-1,5-pentanediol. One C5 or longer alkanediol alone or a combination of two or more may be used.

In particular, C5 to C8 alkanediols are preferred. C5 to C8 alkanediols having a terminal hydroxyl group are more preferred, and 1,2-alkanediols are particularly preferred. For example, 1,2-hexanediol and 3-methyl-1,5-pentanediol are particularly preferred.

Using such an alkanediol generally leads to more effective prevention of ink puddles and further improved wet abrasion resistance.

One specified organic solvent may be used alone, or two or more may be used in combination.

The total percentage of specified organic solvents is 1.0% by mass or more of the total amount of the water-based ink composition. Preferably, the total percentage of specified organic solvents is from 1.0% to 20% by mass, more preferably from 1.0% to 15% by mass, even more preferably from 1.0% to 8.0% by mass, still more preferably from 1.5% to 4.0% by mass. By virtue of containing 1.0% by mass or more specified organic solvent(s), the water-based ink composition does not easily form ink puddles and provides further improved wet abrasion resistance. Specified organic solvent(s) present in an amount of equal to or smaller than the upper extremities of these ranges generally makes the water-based ink composition dry even faster, further improving wet abrasion resistance.

Preferably, the total percentage of specified organic solvents is from 2.0% to 35% by mass of the total amount of organic solvents. More preferably, the total percentage of specified organic solvents to the total amount of organic solvents is from 3.0% to 30% by mass, even more preferably from 5.0% to 20% by mass. Specified organic solvent(s) present in an amount of 2.0% by mass or more of the total amount of organic solvents leads to more effective prevention of ink puddles and further improved wet abrasion resistance. When the percentage of specified organic solvents to the total amount of organic solvents is 35% by mass or less, the water-based ink composition tends to dry even faster, and wet abrasion resistance tends to be further improved.

1.2.1.4. Extra Organic Solvents

The water-based ink composition according to this embodiment may contain extra organic solvents. Any kind of extra organic solvent can be used, but examples include nitrogen-containing solvents, such as 2-pyrrolidone, N-methyl-2-pyrrolidone, and N-ethyl-2-pyrrolidone; polyols, such as glycerol, ethylene glycol, diethylene glycol, triethylene glycol, propylene glycol, dipropylene glycol, 1,3-propanediol, 1,2-butanediol, and 1,4-butanediol; and alcohols, such as methanol, ethanol, n-propyl alcohol, isopropyl alcohol, n-butanol, 2-butanol, tert-butanol, isobutanol, n-pentanol, 2-pentanol, 3-pentanol, and tert-pentanol.

Examples of nitrogen-containing solvents include cyclic amides and acyclic amides. Examples of cyclic amides include the pyrrolidones listed above. Examples of acyclic amides include N,N-dialkylalkylamides. Examples of N,N-dialkylalkylamides include N,N-dialkylalkoxyalkylamides.

Examples of polyols include C4 or shorter alkane polyols and condensates formed by intermolecular condensation between hydroxyl groups of a C4 or shorter alkane polyol. Polyols having two to four hydroxyl groups in the molecule are preferred, and those having two are more preferred.

Polyols and nitrogen-containing solvents, for example, are particularly preferred, such as propylene glycol and 2-pyrrolidone. One extra organic solvent may be used alone, or two or more may be used in combination.

Preferably, the percentage of extra organic solvents is 1% by mass or more, more preferably from 2% to 45% by mass, of the total amount of the water-based ink composition. It is even more preferred that the percentage of extra organic solvents be from 10% to 40% by mass, still more preferably from 15% to 35% by mass, further preferably from 20% to 30% by mass. Adding an amount of extra organic solvent(s) in any of these ranges generally leads to more effective prevention of ink puddles and further improved wet abrasion resistance.

Preferably, the total percentage of organic solvents, i.e., specified plus extra organic solvents, is from 1% to 50% by mass, more preferably from 10% to 45% by mass, even more preferably from 15% to 40% by mass, still more preferably from 20% to 35% by mass of the total amount of the water-based ink composition. Ensuring that the total percentage of organic solvents is in any of these ranges generally leads to more effective prevention of ink puddles and further improved wet abrasion resistance.

Preferably, the organic solvent(s) in the water-based ink composition has a normal boiling point of 160° C. to 280° C., more preferably 160° C. to 270° C., even more preferably 160° C. to 250° C., still more preferably 170° C. to 220° C. Using organic solvent(s) having a normal boiling point in any of these ranges generally leads to more effective prevention of ink puddles and further improved wet abrasion resistance. It is more preferred that the specified organic solvent(s) have a normal boiling point in any of these ranges.

Preferably, the percentage of organic solvents having a normal boiling point in any of the above ranges is from 95% to 100% by mass, more preferably from 98% to 100% by mass, even more preferably from 99% to 100% by mass of the total amount of the water-based ink composition. Ensuring that the percentage of such organic solvents is in any of these ranges generally leads to more effective prevention of ink puddles and further improved wet abrasion resistance.

Preferably, the percentage of organic solvents having a normal boing point outside the above ranges is 5.0% by mass or less, more preferably 2.0% by mass or less, even more preferably 1.0% by mass or less, still more preferably 0.5% by mass or less, in particular 0.1% by mass or less of the total amount of the water-based ink composition. As for the lower limit, the percentage of such organic solvents may be 0% by mass. Ensuring that the percentage of such organic solvents is in any of these ranges generally leads to more effective prevention of ink puddles and further improved wet abrasion resistance.

Preferably, the percentage of organic solvents having a normal boiling point exceeding 280° C. in the water-based ink composition is not more than 1% by mass, more preferably not more than 0.5% by mass, even more preferably not more than 0.1% by mass. A percentage being not more than X % by mass means that the water-based ink composition may contain such organic solvents unless their percentage exceeds X % by mass or may be free of such organic solvents. This is advantageous in that it leads to, for example, stronger wet abrasion resistance, more effective prevention of ink puddles, and higher image quality.

1.2.1.5. Resin

Resin can be, for example, one dissolved or dispersed in emulsion form (resin particles) in the water-based ink composition. For quicker recovery from clogging in particular, resin dispersed in emulsion form is preferred. Using resin in such a form tends to give the resulting recording stronger wet abrasion resistance. In particular, using resin in such a form generally contributes to improving the binding between the recording medium and the ink coating (wet abrasion resistance).

A resin for such purposes can be of any kind, but examples include acrylic resins, vinyl acetate resins, butadiene resins, styrene resins, polyester resins, crosslinked acrylic resins, crosslinked styrene resins, benzoguanamine resins, phenolic resins, silicone resins, epoxy resins, urethane resins, paraffin resins, fluoropolymers, water-soluble resins, and copolymers of monomers forming these resins. Any kind of copolymer can be used, but examples include styrene-butadiene resins and styrene-acrylic resins. Polymer latexes containing any such resin can also be used. Examples include polymer latexes containing fine particles of an acrylic, styrene-acrylic, styrene, crosslinked acrylic, or crosslinked styrene resin. One resin may be used alone, or two or more may be used in combination. It is particularly preferred that the water-based ink composition according to this embodiment contain particles of at least one resin selected from acrylic resins, urethane resins, or polyester resins.

Acrylic resins as mentioned above are polymers obtained by polymerizing at least an acrylic monomer and include copolymers of acrylic and other monomers. Examples of acrylic monomers include (meth)acrylates and (meth)acrylic acid. Examples of other monomers include vinyl monomers, such as styrene.

Urethane resins are resins obtained by polymerization between polyisocyanate and polyol compounds.

Preferably, the resin content is 0.5% by mass or more, more preferably from 1.0% to 20% by mass, even more preferably from 1.0% to 10% by mass, still more preferably from 2.0% to 8.0% by mass, further preferably from 2.0% to 6.0% by mass of the total amount of the water-based ink composition. A resin content equal to or higher than the lower extremities of these ranges generally leads to further improved wet abrasion resistance as mentioned above. A resin content equal to or lower than the upper extremities of these ranges generally leads to more stable ejection and quicker recovery from clogging.

1.2.1.6. Wax

Wax can be, for example, one that dissolves or disperses in emulsion form in the water-based ink composition. Using such a wax tends to give the resulting recording stronger wet abrasion resistance. In particular, such a wax generally contributes to improving wet abrasion resistance by concentrating on the surface of the ink coating on the recording medium (interface between the air and the ink coating). Any such wax can be used, but examples include ester waxes formed by a higher fatty acid a higher monohydric or dihydric (preferably monohydric) alcohol, paraffin waxes, olefin waxes, and mixtures thereof.

Preferably, the wax content is from 0.1% to 3.0% by mass, more preferably from 0.3% to 2.0% by mass, even more preferably from 0.3% to 1.0% by mass of the total amount of the water-based ink composition. A wax content equal to or higher than 0.1% by mass generally leads to further improved wet abrasion resistance as mentioned above. A wax content equal to or lower than 3.0% by mass generally leads to more stable ejection and quicker recovery from clogging.

1.2.1.7. Defoamer

A defoamer can be of any kind, but examples include silicone defoamers, polyether defoamers, fatty acid ester defoamers, and acetylene glycol defoamers. Examples of commercially available defoamers include BYK-011, BYK-012, BYK-017, BYK-018, BYK-019, BYK-020, BYK-021, BYK-022, BYK-023, BYK-024, BYK-025, BYK-028, BYK-038, BYK-044, BYK-080A, BYK-094, BYK-1610, BYK-1615, BYK-1650, BYK-1730, and BYK-1770 (trade names, BYK Japan KK) and Surfynol DF37, DF110D, DF58, DF75, DF220, and MD-20 and EnviroGem AD01 (trade names, Nissin Chemical Industry Co., Ltd.). One defoamer may be used alone, or two or more may be used as a mixture.

Preferably, the defoamer content is from 0.03% to 0.7% by mass, more preferably from 0.05% to 0.5% by mass, even more preferably from 0.08% to 0.3% by mass of the total amount of the water-based ink composition.

1.2.1.8. Surfactant

A surfactant can be of any kind, but examples include acetylene glycol surfactants, fluorosurfactants, and silicone surfactants.

Any kind of acetylene glycol surfactant can be used, but it is preferred to use one or more selected from 2,4,7,9-tetramethyl-5-decin-4,7-diol and alkylene oxide adducts of 2,4,7,9-tetramethyl-5-decin-4,7-diol and 2,4-dimethyl-5-decin-4-ol and alkylene oxide adducts of 2,4-dimethyl-5-decin-4-ol for example. As for commercially available acetylene glycol surfactants, any such surfactant can be used, but examples include OLFINE 104 surfactants, OLFINE E surfactants, such as E1010, and Surfynol 465 and Surfynol 61 (trade names, Nissin Chemical Industry Co., Ltd.). One acetylene glycol surfactant may be used alone, or two or more may be used in combination.

Any kind of fluorosurfactant can be used, but examples include perfluoroalkyl sulfonates, perfluoroalkyl carboxylates, perfluoroalkyl phosphates, perfluoroalkyl ethylene oxide adducts, perfluoroalkyl betaines, and perfluoroalkyl amine oxide compounds. As for commercially available fluorosurfactants, any such surfactant can be used, but examples include S-144 and S-145 (trade names, Asahi Glass Co., Ltd.); FC-170C, FC-430, and FLUORAD FC4430 (trade names, Sumitomo 3M Ltd.); FSO, FSO-100, FSN, FSN-100, and FS-300 (trade names, DuPont); and FT-250 and 251 (trade names, NEOS Co., Ltd.). One fluorosurfactant may be used alone, or two or more may be used in combination.

Examples of silicone surfactants include polysiloxane compounds and polyether-modified organosiloxanes. As for commercially available silicone surfactants, any such surfactant can be used, but specific examples include BYK-306, BYK-307, BYK-333, BYK-341, BYK-345, BYK-346, BYK-347, BYK-348, and BYK-349 (trade names, BYK Japan KK) and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, Shin-Etsu Chemical Co., Ltd.). One silicone surfactant may be used alone, or two or more may be used in combination.

Preferably, the surfactant content is from 0.3% to 3.0% by mass, more preferably from 0.5% to 2.0% by mass, even more preferably from 0.8% to 1.5% by mass of the total amount of the water-based ink composition.

1.3. Treatment Liquid Attachment Step

The recording method according to this embodiment may further include a treatment liquid attachment step, in which a treatment liquid containing a flocculant for relevant component(s) of the water-based ink composition is attached to the recording medium. The treatment liquid is attached in such a manner that the treatment liquid and the water-based ink composition come into contact on the recording medium. Such a treatment liquid attachment step generally helps the relevant component(s) of the water-based ink composition aggregate on the surface of the recording medium, thereby leading to more effective prevention of ink puddles and further improved wet abrasion resistance. The treatment liquid can be attached by ink jet technology as in the foregoing or may be applied, for example using a bar coater, roll coater, or spray. Examples of ink jet modes that can be used are the same as described above in relation to the ejection of the water-based ink composition.

Preferably, in the region, of the recording medium, that retains the largest amount of attached water-based ink composition among the regions to which the water-based ink composition and the treatment liquid have been attached, the amount of attached treatment liquid is 20% by mass or less, more preferably from 2% to 17% by mass, even more preferably from 5% to 15% by mass of the amount of attached water-based ink composition. Attaching an amount of treatment liquid in any of these ranges generally leads to more effective prevention of ink puddles and further improved wet abrasion resistance.

The treatment liquid attachment step may precede or follow the ink attachment step. When the treatment liquid attachment step precedes the ink attachment step, the ink attachment step may be carried out before or after the treatment liquid dries. When the treatment liquid attachment step follows the ink attachment step, it is preferred to carry out the treatment liquid attachment step before the water-based ink composition dries.

1.3.1. Treatment Liquid

The treatment liquid can be of any type that contains a flocculant that causes relevant component(s) of the water-based ink composition to aggregate together. Water, an organic solvent, a defoamer, and/or a surfactant may optionally be contained. A water-based treatment liquid is preferred.

1.3.1.1. Flocculant

Any kind of flocculant can be used as long as it causes the relevant component(s) of the water-based ink composition to aggregate together. Examples include polyvalent metal salts, organic acids, and cationic resins. One flocculant may be used alone, or two or more may be used in combination.

A polyvalent metal salt can be of any kind, but examples include salts of a polyvalent metal and an inorganic or organic acid. The polyvalent metal can be of any species, but examples include the alkaline earth metals, or group-2 metals in the periodic table (e.g., magnesium and calcium), the group-3 transition metals in the periodic table (e.g., lanthanum), the earth metals, or group-13 metals in the periodic table (e.g., aluminum), and lanthanides (e.g., neodymium). Suitable salts of such polyvalent metals include carboxylates (formates, acetates, benzoates, etc.), sulfates, nitrates, chlorides, and thiocyanates. Examples of particularly preferred ones include calcium or magnesium salts of carboxylic acids (formic acid, acetic acid, benzoic acid, etc.), the calcium or magnesium salt of sulfuric acid, the calcium or magnesium salt of nitric acid, calcium chloride, magnesium chloride, and the calcium or magnesium salt of thiocyanic acid. One polyvalent metal salt may be used alone, or two or more may be used in combination.

An organic acid can be of any kind, but examples include acetic acid, oxalic acid, malonic acid, and citric acid. Carboxylic acids, whether monocarboxylic or having two or more carboxyl groups, are particularly preferred. Salts of organic acids can also be used. One organic acid or salt thereof may be used alone, or two or more may be used in combination. Salts of organic acids that are polyvalent metal salts are included in polyvalent metal salts.

A cationic resin can be of any kind, but examples include amine resins, such as amine-epichlorohydrin condensed polymers, polyallylamines, and polyallylamine derivatives. Cationic resins that dissolve in the treatment liquid or that disperse, for example to form a resin emulsion, in the treatment liquid are preferred, with the former more preferred than the latter.

Preferably, the flocculant content is from 1.0% to 10% by mass, more preferably from 3.0% to 10% by mass, even more preferably from 3.0% to 7.0% by mass of the total amount of the treatment liquid. Using an amount of flocculant(s) in any of these ranges generally leads to more effective prevention of ink puddles and further improved wet abrasion resistance. The resulting recording, moreover, also tends to be further improved in terms of the prevention of bleeds and completeness.

1.3.1.2. Water

Preferably, the water content of the treatment liquid is 40% by mass or more, more preferably from 50% to 99.5% by mass, even more preferably from 55% to 85% by mass, still more preferably from 60% to 80% by mass, further preferably from 65% to 75% by mass of the total amount of the treatment liquid.

1.3.1.3. Organic Solvent

The treatment liquid may contain an organic solvent. The type and amount of organic solvent(s) may be the same as in the ink composition described above. Any kind of organic solvent may be contained in the treatment liquid, but examples include glycol monoethers, such as ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxybutanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, propylene glycol monobutyl ether, dipropylene glycol monobutyl ether, and tetraethylene glycol monobutyl ether; glycol diethers, such as diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, and tripropylene glycol dimethyl ether; nitrogen-containing solvents, such as 2-pyrrolidone, N-methyl-2-pyrrolidone, and N-ethyl-2-pyrrolidone; glycerol; glycols, such as ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, and 1,6-hexanediol; and alcohols, such as methanol, ethanol, n-propyl alcohol, isopropyl alcohol, n-butanol, 2-butanol, tert-butanol, isobutanol, n-pentanol, 2-pentanol, 3-pentanol, and tert-pentanol. Propylene glycol, 2-pyrrolidone, and 1,2-hexanediol, for example, are particularly preferred. One organic solvent may be used alone, or two or more may be used in combination.

Preferably, the organic solvent content is from 10% to 40% by mass, more preferably from 15% to 35% by mass, even more preferably from 20% to 30% by mass of the total amount of the treatment liquid.

The treatment liquid may contain an organic solvent that is a specified organic solvent as defined above in relation to the water-based ink composition. Examples of specified organic solvents that can be contained in the treatment liquid are the same as listed above in relation to the water-based ink composition. Preferably, the percentage of specified organic solvents in the treatment liquid is 1.0% by mass or more, more preferably from 1.0% to 15% by mass, even more preferably from 1.0% to 8.0% by mass, still more preferably from 1.5% to 4.0% by mass of the total amount of the treatment liquid. Specified organic solvent(s) present in an amount of 1.0% by mass or more generally leads to more effective prevention of ink puddles and further improved wet abrasion resistance. When the percentage of specified organic solvents is 15% by mass or less, the treatment liquid tends to dry even faster.

1.3.1.4. Defoamer

Examples of defoamers that can be contained in the treatment liquid are the same as listed in relation to the water-based ink composition. Preferably, the defoamer content is from 0.03% to 0.7% by mass, more preferably from 0.05% to 0.5% by mass, even more preferably from 0.08% to 0.3% by mass of the total amount of the treatment liquid.

1.3.1.5. Surfactant

Examples of surfactants that can be contained in the treatment liquid are the same as listed in relation to the water-based ink composition. Preferably, the surfactant content is from 0.5% to 7.0% by mass, more preferably from 0.7% to 5.0% by mass, even more preferably from 1.0% to 4.0% by mass of the total amount of the treatment liquid. Using an amount of surfactant(s) in any of these ranges generally leads to further improved wettability of the treatment liquid.

1.4. Clear Ink Attachment Step

The recording method according to this embodiment may further include a clear ink attachment step, in which a clear ink composition is attached to the recording medium. Recording media used in this embodiment are aesthetically superior owing to its fiber-based recording surface, but on the other hand tend to be inferior in wet abrasion resistance because their surface easily becomes rough. Increasing the resin content, for example, of the water-based ink composition improves wet abrasion resistance, but this approach has limitations, for example in view of viscosity suitable for ink jet technology. Adding a clear ink attachment step generally leads to further improved wet abrasion resistance of the resulting recording. The clear ink composition can be attached by, for example, ink jet technology as in the foregoing. The clear ink composition is attached in such a manner that the clear and water-based ink compositions come into contact on the recording medium. The clear ink composition may be attached in such a manner that it comes into contact with the combined water-based ink composition and treatment liquid on the recording medium.

The clear ink attachment step may precede or follow the ink attachment step, but preferably follows the ink attachment step. When the clear ink attachment step follows the ink attachment step, the clear ink attachment step may be carried out before or after the water-based ink composition dries. When the clear ink attachment step precedes the ink attachment step, the ink attachment step may be carried out before or after the clear ink composition dries.

The treatment liquid attachment step, when performed, may precede or follow the clear ink attachment step. When the treatment liquid attachment step precedes the clear ink attachment step, the clear ink attachment step may be carried out before or after the treatment liquid dries. When the treatment liquid attachment step follows the clear ink attachment step, it is preferred to carry out the treatment liquid attachment step before the clear ink composition dries.

In the regions, of the recording medium, to which the water-based and clear ink compositions are attached, the amount of attached clear ink composition is preferably from 0.1 to 2.0 mg/inch$^2$, more preferably from 0.3 to 2.0 mg/inch$^2$, even more preferably from 0.3 to 1.5 mg/inch$^2$. Attaching an amount of clear ink composition in any of these ranges generally leads to further improved wet abrasion resistance of the resulting recording.

1.4.1. Clear Ink Composition

The formula of the clear ink composition can be the same as that of the water-based ink composition except for pigments. A "clear ink" is an ink that is used not to color a recording medium but for any other purpose. Examples of purposes of a clear ink include, but are not limited to, to improve the wet abrasion resistance and other characteristics of the recording, to adjust the gloss of the recording medium, and to improve the fixation, adhesion, etc., of the water-based ink composition. The clear ink composition is not a treatment liquid as described above. A water-based clear ink composition is preferred.

Given that the clear ink composition is used for such purposes, it is preferred that its pigment content be 0.2% by mass or less, more preferably 0.1% by mass or less, even more preferably 0.05% by mass or less, in particular 0.01% by mass or less. As for the lower limit, the pigment content may be 0% by mass.

1.4.1.1. Resin

Examples of resins that can be contained in the clear ink composition are the same as listed in relation to the water-based ink composition. It is particularly preferred that the clear ink composition contain at least one resin selected from acrylic resins, urethane resins, and polyester resins. Adding particles of such resin(s) generally leads to further improved wet abrasion resistance.

Preferably, the resin content is 1.0% by mass or more, more preferably from 1% to 20% by mass, even more preferably from 2.0% to 8.0% by mass, still more preferably from 2.0% to 6.0% by mass of the total amount of the clear ink composition. A resin content equal to or higher than 1.0% by mass generally leads to further improved wet abrasion resistance. A resin content equal to or lower than 10% by mass generally leads to more stable ejection and quicker recovery from clogging.

1.4.1.2. Wax

Examples of waxes that can be contained in the clear ink composition are the same as listed in relation to the water-based ink composition. Preferably, the wax content is from 0.1% to 5.0% by mass, more preferably from 0.3% to 3.0% by mass, even more preferably from 0.3% to 2.0% by mass of the total amount of the clear ink composition. A wax content equal to or higher than 0.1% by mass generally leads to further improved wet abrasion resistance. A wax content equal to or lower than 5.0% by mass generally leads to more stable ejection and quicker recovery from clogging.

1.4.1.3. Water

Preferably, the water content is from 40% to 99% by mass, more preferably from 55% to 75% by mass, even more preferably from 60% to 70% by mass of the total amount of the clear ink composition.

1.4.1.4. Organic Solvent

Any kind of organic solvent may be contained in the clear ink composition, but examples include glycol monoethers, such as ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxybutanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, propylene glycol monobutyl ether, dipropylene glycol monobutyl ether, and tetraethylene glycol monobutyl ether; glycol diethers, such as diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, and tripropylene glycol dimethyl ether; nitrogen-containing solvents, such as 2-pyrrolidone, N-methyl-2-pyrrolidone, and N-ethyl-2-pyrrolidone; glycerol; glycols, such as ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, and 1,6-hexanediol; and alcohols, such as methanol, ethanol, n-propyl alcohol, isopropyl alcohol, n-butanol, 2-butanol, tert-butanol, isobutanol, n-pentanol, 2-pentanol, 3-pentanol, and tert-pentanol. Propylene glycol, 2-pyrrolidone, and 1,2-hexanediol, for example, are particularly preferred. One organic solvent may be used alone, or two or more may be used in combination.

Preferably, the organic solvent content of the clear ink composition is from 10% to 40% by mass, more preferably from 15% to 35% by mass, even more preferably from 20% to 30% by mass of the total amount of the clear ink composition.

The clear ink composition may contain an organic solvent that is a specified organic solvent as defined above in relation to the water-based ink composition. Examples of specified organic solvents that can be contained in the clear ink composition are the same as listed above in relation to the water-based ink composition. Preferably, the percentage of specified organic solvents in the clear ink composition is 1.0% by mass or more, more preferably from 1.0% to 15% by mass, even more preferably from 1.0% to 8.0% by mass, still more preferably from 1.5% to 4.0% by mass of the total amount of the clear ink composition. Specified organic solvent(s) present in an amount of 1.0% by mass or more generally leads to further improved wet abrasion resistance. When the percentage of specified organic solvents is 15% by mass or less, the clear ink composition tends to dry even faster, and, as a result, wet abrasion resistance tends to be further improved.

1.4.1.5. Defoamer

Examples of defoamers that can be contained in the clear ink composition are the same as listed in relation to the water-based ink composition. Preferably, the defoamer content is from 0.03% to 0.7% by mass, more preferably from 0.05% to 0.5% by mass, even more preferably from 0.08% to 0.3% by mass of the total amount of the clear ink composition.

1.4.1.6. Surfactant

Examples of surfactants that can be contained in the clear ink composition are the same as listed in relation to the water-based ink composition. Preferably, the surfactant content is from 0.3% to 3.0% by mass, more preferably from 0.5% to 2.0% by mass, even more preferably from 0.8% to 1.5% by mass of the total amount of the clear ink composition. Using an amount of surfactant(s) in any of these ranges generally leads to further improved wettability of the clear ink composition.

1.5. Heating Step

The recording method according to this embodiment may have a heating step, in which the recording medium is heated, during any of the ink attachment, treatment liquid attachment, and clear ink attachment steps, between any two of these steps, or after these steps. Any kind of heating unit can be used to heat the recording medium, but examples include ones having a warming capability, such as a platen heater, a warm-air heater, and an IR heater, and ones having no warming capability, such as an air blower.

Heating the recording medium during the ink attachment, treatment liquid attachment, or clear ink attachment step helps volatile component(s) in the water-based ink composition, treatment liquid, or clear ink composition attached to the recording medium evaporate. This generally leads to more effective prevention of ink puddles.

Whether or not the ink attachment, treatment liquid attachment, or clear ink attachment step includes heating the recording medium, it is preferred that the recording medium have a surface temperature of 45° C. or less, preferably 15° C. or more, during that step. More preferably, the surface temperature is from 20° C. to 40° C., more preferably from 25° C. to 38° C., in particular from 30° C. to 35° C. This temperature represents the highest temperature of the portion of the surface of the recording medium to which the composition or treatment liquid is attached in that attachment step. A surface temperature in any of these ranges is advantageous in that it leads to, for example, more effective prevention of ink puddles, stronger abrasion resistance, and higher image quality.

Heating the recording medium during any of the ink attachment, treatment liquid attachment, and clear ink attachment steps or after these steps helps accelerate the drying of the water-based ink composition, treatment liquid, and/or clear ink composition. This generally leads to more effective prevention of ink puddles and further improved wet abrasion resistance.

2. Ink Jet Recording Apparatus

Figure 6:
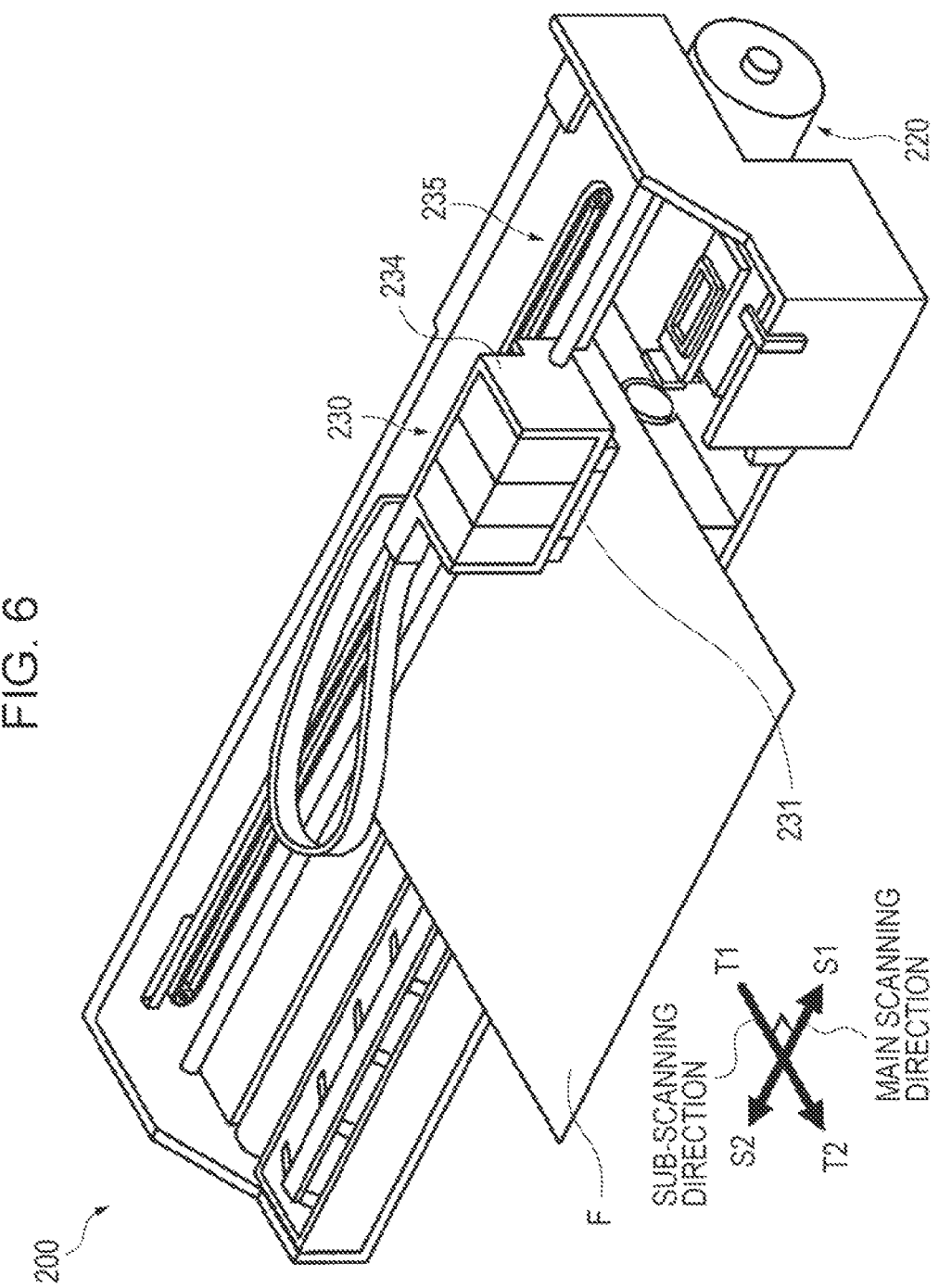
FIG. 6 is a perspective view of an ink jet recording apparatus according to an embodiment.

FIG. 6 illustrates a perspective view of a serial printer as an example of an ink jet recording apparatus used in the recording method according to this embodiment. As illustrated in FIG. 6, the serial printer 200 includes a transport section 220 and a recording section 230. The transport section 220 transports a recording medium F fed to the serial printer 200 to the recording section 230 and, after a recording job, discharges the recording medium F out of the serial printer 200. Specifically, the transport section 220 has feeding rollers and transports the fed recording medium F in a sub-scanning direction T1-T2 therewith.

The recording section 230 includes an ink jet head 231 that ejects a composition toward the recording medium F fed from the transport section 220, a carriage 234 for the ink jet head 231, and a carriage-moving mechanism 235 that moves the carriage 234 in a main scanning direction S1-S2 in relation to the recording medium F.

The ink jet head 231 of this serial printer 200 is shorter than the recording medium F in the direction of the width of the recording medium F. The head 231 moves to carry out a recording job with multiple passes (multi-pass recording). The carriage 234, which moves in a predetermined direction, supports the head 231. As the carriage 234 moves, the head 231 also moves and at the same time ejects a composition onto the recording medium F. By repeating this, a recording job is performed with two or more passes (multi-pass recording). A pass is also referred to as a main scan. Between passes, the recording medium F is transported, and this is referred to as a sub-scan. That is, main scans and sub-scans alternate.

The ink jet head 231 has a line of nozzles arranged in the sub-scanning direction from which a water-based ink composition is ejected. In a certain main scan, the head 231 attaches the ink to the zone of the recording medium F that faces this line of nozzles (attachment zone). When the distance the recording medium F moves per sub-scan is shorter than the length of the line of nozzles in the sub-scanning direction, the head 231 attaches the ink to a certain region within the attachment zone in a certain main scan and then more ink in another. That is, the head 231 attaches the ink to a certain (the same) region in a certain main scan and another.

As a result, the ink jet head 231 can attach an amount of ink to a certain region of the recording medium F in two or more divided main scans. This is advantageous in that it leads to, for example, more effective prevention of ink puddles and higher image quality.

When the distance the recording medium F moves per sub-scan is about 1/n of the length of the line of nozzles in the sub-scanning direction, the ink jet head 231 makes n main scans over the same region of the recording medium F and attaches a certain amount of ink to this region over the n main scans. The number n is also referred to as pass number or the number of scans (main scans). Making two or more main scans over the same region is advantageous in that it leads to, for example, more effective prevention of ink puddles and higher image quality. The pass number is 1 or more, preferably 2 or more, more preferably from 3 to 20, even more preferably from 4 to 15, in particular from 5 to 10. The smaller the pass number the better, because it helps increase the speed of recording.

The recording apparatus according to this embodiment does not need to be a serial-recording printer as described above but may be a line-recording printer as described earlier herein. The recording apparatus may have a heating unit that heats the recording medium.

3. Examples and Comparative Examples

The following describes the first aspect of the present disclosure in further detail by providing examples and comparative examples, but the first aspect of the disclosure is not limited to these Examples. Various modifications can be made without departing from the gist of the first aspect of the disclosure. Amounts of materials in the unit of % or parts are by mass unless stated otherwise.

3.1. Preparation of Water-Based Ink Compositions and Treatment Liquids

Water-based ink compositions C1 to C3 and treatment liquids OP1 to OP4 were prepared according to the formulae presented in Tables 1 and 2. The preparation of each ink or treatment liquid was as follows: The ingredients, specified in Table 1 or 2, were put into a container, mixed by stirring for 2 hours using a magnetic stirrer, and the resulting mixture was filtered through a 5-μm membrane filter to remove impurities, such as dust and coarse particles. The amounts of ingredients in Tables 1 and 2 are all in % by mass, and the purified water was added to make the total mass of the composition 100%.

The water-based ink compositions were made with colorants (liquid dispersions of a cyan pigment). These colorants were prepared beforehand as follows.

Pigment Dispersion A

A reactor equipped with a stirrer, a reflux condenser, a drop dispenser, and a thermometer was charged with 3 g of potassium sulfate and 30 g of water. In a nitrogen atmosphere and with the contents of the reactor stirred at 80° C., 40 g of a liquid mixture of methacrylic acid, butyl acrylate, styrene, and hydroxyethyl acrylate in a ratio by mass of 25/50/15/10 was added dropwise over 4 hours to cause polymerization. After polymerization, the reactor was cooled to room temperature. Then 7 parts by mass of potassium hydroxide, 23 parts by mass of water, and 30 parts by mass of triethylene glycol mono-n-butyl ether were added to the liquid, and the resulting mixture was heated with stirring at 80° C. to give an aqueous solution of resin (resin solution A). The resin had a weight-average molecular weight of 7000 and an acid value of 150 mg KOH/g.

Ten parts by mass of resin solution A was mixed with 20 parts by mass of a pigment (C.I. Pigment Blue 15:3), 10 parts by mass of diethylene glycol, and 60 parts by mass of deionized water. The pigment was dispersed using a zirconia bead mill, giving a liquid dispersion of pigment (pigment dispersion A).

Pigment Dispersion B

A resin was prepared in the same way, but the ratio by mass between the monomers of methacrylic acid, butyl acrylate, styrene, and hydroxyethyl acrylate were changed to 20/45/20/15. After polymerization, 5.5 parts by mass of potassium hydroxide, 24.5 parts by mass of water, and 30 parts by mass of triethylene glycol mono-n-butyl ether were added to the liquid, and the resulting mixture was heated with stirring at 80° C. to give an aqueous solution of resin (resin solution B).

The resin had a weight-average molecular weight of 7000 and an acid value of 120 mg KOH/g.

Ten parts by mass of resin solution B was mixed with 20 parts by mass of a pigment (C.I. Pigment Blue 15:3), 10 parts by mass of diethylene glycol, and 60 parts by mass of deionized water. The pigment was dispersed using a zirconia bead mill, giving a liquid dispersion of pigment (pigment dispersion B).

In Table 1, the values in the Liquid dispersion of pigment, Resin, and Wax rows are the solids content in % by mass calculated from the concentration of solids in each substance. Table 1 also includes zeta potentials of inks C1 to C3, which are average zeta potentials measured on 1-in-1000 dilutions of the inks in water using Zetasizer Nano ZS (Malvern).

TABLE 1

| | Color ink name | C1 | C2 | C3 |
|---|---|---|---|---|
| Organic solvents | Propylene glycol (boiling point, 188° C.) | 15.0 | 15.0 | 15.0 |
| | 2-Pyrrolidone (boiling point, 245° C.) | 10.0 | 10.0 | 10.0 |
| | 1,2-Hexanediol (boiling point, 223° C.) | 2.0 | 2.0 | 2.0 |
| | Glycerol (boiling point, 290° C.) | — | — | 10.0 |
| Liquid dispersion of pigment | Cyan pigment dispersion A (solids content) | 3.0 | — | 3.0 |
| | Cyan pigment dispersion B (solids content) | — | 3.0 | — |
| Resin | Joncryl 62J | 5.0 | 5.0 | 5.0 |
| Wax | AQUACER539 | 0.5 | 0.5 | 0.5 |
| Defoamer | Surfynol DF110D | 0.1 | 0.1 | 0.1 |
| Surfactant | BYK348 | 1.0 | 1.0 | 1.0 |
| Purified water | | Balance | Balance | Balance |
| Total | | 100.0 | 100.0 | 100.0 |
| Zeta potential (mV) | | −61.0 | −52.0 | −61.0 |

TABLE 2

| | Treatment liquid name | OP1 | OP2 | OP3 | OP4 |
|---|---|---|---|---|---|
| Organic solvents | Propylene glycol (boiling point, 188° C.) | 10.0 | 10.0 | 10.0 | 10.0 |
| | 2-Pyrrolidone (boiling point, 245° C.) | 10.0 | 10.0 | 10.0 | 10.0 |
| | 1,2-Hexanediol (boiling point, 223° C.) | 2.0 | 2.0 | 2.0 | 2.0 |
| Flocculant | Calcium acetate monohydrate | 5.0 | — | — | — |
| | Magnesium sulfate heptahydrate | — | 5.0 | — | — |
| | Malonic acid | — | — | 5.0 | — |
| | Catiomaster PD-7 (solids content) | — | — | — | 5.0 |
| Defoamer | Surfynol DF110D | 0.1 | 0.1 | 0.1 | 0.1 |
| Surfactant | BYK348 | 1.0 | 1.0 | 1.0 | 1.0 |
| Purified water | | Balance | Balance | Balance | Balance |
| Total | | 100.0 | 100.0 | 100.0 | 100.0 |

The details of the substances in Tables 1 and 2 are as follows.

Joncryl 62J: Trade name, BASF, a styrene-acrylic resin. Resin particles.

AQUACER 539: Trade name, BYK Japan, a polyethylene wax

Surfynol DF110D: Trade name, Air Products, an acetylene diol surfactant (defoamer)

BYK-348: Trade name, BYK Japan KK, a silicone surfactant

Catiomaster PD-7: Trade name, Yokkaichi Chemical Co., Ltd., a polyamine resin (epichlorohydrin-amine derivative)

3.2. Testing 3.2.1. Measurement of the Ratio A/B

The absorbance ratio (A/B) in each Example or Comparative Example was measured as follows. To 40 g of purified water, 0.04 g of the water-based ink composition was added dropwise and stirred. Absorbance was measured on the resulting liquid at the peak wavelength within the range of 380.0 nm to 680 nm (absorbance B). The water-based ink composition was added dropwise to 40 g of the treatment liquid to achieve the same concentration and stirred, and absorbance was measured on the resulting liquid at the same wavelength (absorbance A). The ratio (A/B) was determined. Three measurements were averaged, and JASCO V-700 UV-visible spectrophotometer was used to measure the absorbances. The mixtures were allowed to stand for 5 minutes before measurement, and then the top of the liquid surface was sampled.

3.2.2. Recording Test

In the Examples and Comparative Examples specified in Tables 3 and 4, recordings were produced as follows using the treatment liquid, water-based ink composition, and recording medium identified in the tables. The printer was a modified version of SC-S40650 (model number, Seiko Epson Corporation) having a platen heater as described below and a fan installed (hereinafter also referred to as "modified SC-S40650"). The platen was made of aluminum and measured 1.6 m in the direction perpendicular to the direction of transport of the recording medium. The recording medium measured 1.5 m in the direction perpendicular to the direction of transport thereof. The resolution and the number of scans were 720×1440 dpi and eight, respectively. The ink jet head had lines of nozzles with the nozzle density being 360 dpi and the number of nozzles 360 (nozzles/line). During the print job, the recording medium was heated on the platen to the highest temperature indicated in Tables 3 and 4. The amounts of water-based ink composition and treatment liquid attached were 12 mg/inch$^2$ and 1.2 mg/inch$^2$, respectively. After the ink and treatment liquid attachment step, the recording medium was heated to 90° C. using an afterheater.

Tables 3 and 4 include data on the type of recording medium used. The following recording media were used.

M1: ORAJET 3169G-010 (trade name, ORAFOL Japan Inc., polyvinyl chloride; substrate thickness, 100 μm)

M2: ORAJET 3651G-010 (trade name, ORAFOL Japan Inc., polyvinyl chloride; substrate thickness, 70 μm)

Separately, the temperature of the recording medium under the recording conditions was measured at twenty points (lateral ends and equally spaced points) on the recording side of the portion of the recording medium facing the ink jet head, and the difference between the highest and lowest temperatures was determined. The highest temperature and the temperature difference (variation) are presented in Tables 3 and 4. A recording job was continued for at least minutes, and the temperature was measured 10 minutes after the start of recording.

Tables 3 and 4 also include data on the thickness and shape of the platen used in the recording test. In the Platen shape row, "Flat" means that the platen used in that Example or Comparative Example had a flat and non-ribbed support surface as illustrated in FIG. 5. The support surface touched the recording medium in at least 99% by area thereof and had vacuum holes each measuring 4 mm in diameter. "Ribbed" means that the support surface of the platen had ribs and touched the recording medium in less than 50% by area thereof. The thickness in the tables is that of the aluminum plate forming the support surface of the platen.

Tables 3 and 4, moreover, include data on air temperature and air velocity. These are the temperature and velocity of the air blown by the fan measured at the ink jet head above the platen.

3.2.3. In-plane Color Differences

The modified SC-S40650 was loaded with the ink, and a solid pattern was recorded over the entire recordable width of the recording medium. Using a spectrocolorimeter (GretagMacbeth; model, Spectrolino) and a D65 light source, color was measured at twenty equally spaced points on the recording medium including the vicinity of the lateral ends, and the L*a*b* color differences (ΔE*ab) (CIE 1976; hereinafter referred to as "color differences (ΔE)") were determined as a measure of color differences between the measurement points. In-plane color differences were graded according to the criteria below, with the results presented in Tables 3 and 4.

AA: ΔE is 1.5 or less.

A: ΔE is more than 1.5 and 2.0 or less.

B: ΔE is more than 2.0 and 2.5 or less.

C: ΔE is more than 2.5.

3.2.4. Recovery from Clogging When Left

The modified SC-S40650 was loaded with the ink, and a recording job was simulated without capping. Specifically, the printer was operated with the assigned recording parameters in the same way as it performs a recording job, except that no ink was ejected from the head. With the printer placed in a 20% humidity environment, this simulated recording job was continued for 1 day. Then a cleaning operation was run, and the number of nozzles that recovered was counted. One gram of ink was discharged from the line of nozzles per run of cleaning. Recovery from clogging was graded according to the criteria below, with the results presented in Tables 3 and 4.

AA: All nozzles recovered after one or two runs of cleaning.

A: All nozzles recovered after three runs of cleaning.

B: All nozzles recovered after four to six runs of cleaning.

C: Some nozzles did not recover even after six runs of cleaning.

3.2.5. Recovery from Clogging with Mixture

The modified SC-540650 was loaded with the ink, and then the nozzle face of the ink jet head was gently patted with a Bemcot wiper wet with the treatment liquid to make all nozzles fail to eject the ink. Then a cleaning operation was run, and the nozzles were checked for recovery from the failure. One gram of ink was discharged from the line of nozzles per run of cleaning. Recovery from clogging was graded according to the criteria below, with the results presented in Tables 3 and 4.

AA: All nozzles recovered after one or two runs of cleaning.

A: All nozzles recovered after three runs of cleaning.

B: All nozzles recovered after four to six runs of cleaning.

C: Some nozzles did not recover even after six runs of cleaning.

3.2.6. Quality of Solid Image

The modified SC-540650 was loaded with the ink, and a cyan solid pattern was printed on a recording medium having a width of 1.5 m (M1 or M2). The printed article was visually inspected. Image quality was graded according to the criteria below, with the results presented in Tables 3 and 4.

AA: The color of the ink is uniform and does not look dark or light at any point in the image.

A: The color of the ink is dark or light at a few points, but the overall quality of the image is acceptable.

B: The color of the ink is dark or light at several points, making the overall quality of the image somewhat unacceptable.

C: The color of the ink is dark or light at many points, making the overall quality of the image quite unacceptable.

TABLE 3

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Treatment liquid | OP1 | OP2 | OP3 | OP4 | OP1 | OP1 | OP1 | OP1 | OP1 | OP1 |
| Color ink | C1 | C1 | C1 | C1 | C2 | C1 | C1 | C1 | C1 | C3 |
| Recording medium | M1 | M1 | M1 | M1 | M1 | M1 | M1 | M1 | M1 | M1 |
| Platen thickness (mm) | 2.0 | 2.0 | 2.0 | 2.0 | 2.0 | 8.0 | 2.0 | 2.0 | 2.0 | 2.0 |
| Highest temperature of the recording medium on the platen (° C.) | 40.0 | 40.0 | 40.0 | 40.0 | 40.0 | 40.0 | 40.0 | 40.0 | 40.0 | 40.0 |
| Platen shape | Flat | Flat | Flat | Flat | Flat | Flat | Flat | Flat | Flat | Flat |
| Recording medium temperature difference (° C.) | 6.0 | 6.0 | 6.0 | 6.0 | 6.0 | 6.0 | 5.0 | 5.0 | 7.0 | 6.0 |
| Air temperature (° C.) | 25.0 | 25.0 | 25.0 | 25.0 | 25.0 | 25.0 | 35.0 | 25.0 | 25.0 | 25.0 |
| Air velocity (m/sec) | 2.0 | 2.0 | 2.0 | 2.0 | 2.0 | 2.0 | 2.0 | 3.0 | 1.0 | 2.0 |
| Absorbance ratio (A/B) | 0.80 | 0.87 | 0.85 | 0.52 | 0.73 | 0.80 | 0.80 | 0.80 | 0.80 | 0.80 |
| In-plane color differences | A | B | B | AA | A | AA | AA | AA | B | A |
| Recovery from clogging when left | A | A | A | A | B | A | B | B | AA | AA |
| Recovery from clogging with mixture | A | AA | AA | B | B | A | A | A | A | A |
| Quality of solid image | A | B | B | AA | A | A | AA | AA | A | B |

TABLE 4

| | Example 11 | Example 12 | Example 13 | Example 14 | Comparative Example 1 | Comparative Example 2 |
|---|---|---|---|---|---|---|
| Treatment liquid | OP1 | OP1 | OP1 | OP1 | — | OP4 |
| Color ink | C1 | C1 | C1 | C1 | C1 | C2 |
| Recording medium | M2 | M1 | M1 | M1 | M1 | M1 |
| Platen thickness (mm) | 2.0 | 2.0 | 2.0 | 2.0 | 2.0 | 2.0 |
| Highest temperature of the recording medium on the platen (° C.) | 40.0 | 45.0 | 35.0 | 40.0 | 40.0 | 40.0 |
| Platen shape | Flat | Flat | Flat | Flat | Flat | Flat |
| Recording medium temperature difference (° C.) | 6.0 | 6.0 | 6.0 | 8.0 | 6.0 | 6.0 |
| Air temperature (° C.) | 25.0 | 25.0 | 25.0 | — | 25.0 | 25.0 |
| Air velocity (m/sec) | 2.0 | 2.0 | 2.0 | — | 2.0 | 2.0 |
| Absorbance ratio (A/B) | 0.80 | 0.80 | 0.80 | 0.80 | — | 0.44 |
| In-plane color differences | AA | AA | B | B | C | AA |
| Recovery from clogging when left | A | B | AA | AA | A | B |
| Recovery from clogging with mixture | A | A | A | A | — | C |
| Quality of solid image | AA | AA | B | B | C | AA |

| | Comparative Example 3 | Comparative Example 4 | Comparative Example 5 | Comparative Example 6 |
|---|---|---|---|---|
| Treatment liquid | OP1 | OP4 | OP1 | OP1 |
| Color ink | C1 | C2 | C1 | C1 |
| Recording medium | M1 | M1 | M1 | M1 |
| Platen thickness (mm) | 2.0 | 2.0 | 2.0 | 2.0 |
| Highest temperature of the recording medium on the platen (° C.) | 40.0 | 40.0 | 50.0 | 25.0 |
| Platen shape | Ribbed | Ribbed | Flat | Flat |
| Recording medium temperature difference (° C.) | 12.0 | 12.0 | 7.0 | 0.0 |

TABLE 4-continued

|  | | | | |
|---|---|---|---|---|
| Air temperature (° C.) | 25.0 | 25.0 | 25.0 | 25.0 |
| Air velocity (m/sec) | 2.0 | 2.0 | 2.0 | 2.0 |
| Absorbance ratio (A/B) | 0.80 | 0.44 | 0.80 | 0.80 |
| In-plane color differences | C | A | AA | C |
| Recovery from clogging when left | A | B | C | AA |
| Recovery from clogging with mixture | A | C | A | A |
| Quality of solid image | C | AA | AA | C |

3.3. Test Results

In the Examples, the ink jet recording apparatus included a recording medium support having a flat support surface and a heating mechanism that heats the recording medium support. A water-based ink composition was attached to a recording medium heated and supported by the recording medium support, and the absorbance ratio (A/B) for the water-based ink composition was not less than 0.5 and not more than 0.95. In the ink attachment step, furthermore, the recording medium was heated so that the surface thereof reached a maximum temperature of not less than 28.0° C. and 45.0° C. or less. As a result, all Examples achieved small in-plane color differences and quick recovery from clogging.

The Comparative Examples, which were contrary to the Examples in any of the above conditions, were worse in in-plane color differences or recovery from clogging. Further details are as follows.

Examples 1 to 5 indicate that recovery from clogging was quicker with higher absorbance ratio (A/B). In-plane color differences and image quality were better with lower absorbance ratio (A/B).

Examples 1 and 6 indicate that in-plane color differences were reduced more effectively with larger thickness of the platen. Examples 1 and 11 indicate that in-plane color differences and image quality were better with a thicker recording medium.

Examples 1, 7 to 9, and 14 indicate that in-plane color differences and image quality improved with the use of a blow of air. In-plane color differences and image quality became even better with higher temperature and faster velocity of the air, and recovery from clogging was quicker with lower temperature and slower velocity of the air.

Comparative Example 1 indicates that in-plane color differences and image quality were poor when no treatment liquid was used.

Comparative Example 2 indicates that recovery from clogging was slow when the absorbance ratio (A/B) was less than 0.5.

Comparative Example 3 indicates that in-plane color differences were large when the support surface for the recording medium was not flat. It should be noted that in Comparative Example 4, in which the absorbance ratio (A/B) was less than 0.5, in-plane color differences were not large despite the non-flat support surface for the recording medium. It appears that in-plane color differences can decrease when the absorbance ratio (A/B) is 0.5 or more.

Comparative Examples 5 and 6 indicate that recovery from clogging was slow when the recording medium on the platen was too hot. In-plane color differences and image quality were poor when the recording medium on the platen was too cold.

The following describes the second aspect of the present disclosure more specifically using examples and comparative examples. The second aspect of the disclosure is not limited to these Examples.

1. Preparation of Water-Based Ink Compositions 1.1. Preparation of a Liquid Dispersion of Pigment Forty parts by mass of a styrene-acrylic acid copolymer (copolymer of methacrylic acid, butyl acrylate, styrene, and hydroxyethyl acrylate in a ratio by mass of 25/50/15/10; weight-average molecular weight, 7000; acid value, 150 mg KOH/g) was added to a mixture of 7 parts by mass of potassium hydroxide and 53 parts by mass of water. The resulting mixture was heated with stirring at 80° C. to give an aqueous solution of resin. Ten parts by mass of this aqueous solution of resin was mixed with 20 parts by mass of a pigment (C.I. Pigment Red 122) and 70 parts by mass of deionized water. The pigment was dispersed using a zirconia bead mill, giving a liquid dispersion of the magenta pigment.

Each water-based ink composition in Table 1 was obtained by putting ingredients into a mixing tank according to the formula presented in the table, mixing the ingredients by stirring, and filtering the resulting mixture through a 5-μm membrane filter. In the table, the values for the ingredients of each ink are in % by mass. The values in the Liquid Dispersion of Pigment row are the solids content in % by mass.

TABLE 1

| | | Water-based ink compositions | | | | | |
|---|---|---|---|---|---|---|---|
| | | Ink A | Ink B | Ink C | Ink D | Ink E | Ink F |
| Extra organic solvents | Propylene glycol | 10.0 | 10.0 | 10.0 | 10.0 | 10.0 | 10.0 |
| | 2-Pyrrolidone | 15.0 | 15.0 | 15.0 | 15.0 | 15.0 | 15.0 |
| Specified organic solvent | 1,2-Hexanediol | 2.0 | — | — | — | 5.0 | — |
| | 3-Methyl-1,5-pentanediol | — | 2.0 | — | — | — | — |
| | Triethylene glycol monobutyl ether | — | — | 2.0 | — | — | — |
| | Diethylene glycol monobutyl ether | — | — | — | 2.0 | — | — |

TABLE 1-continued

|  |  |  |  |  |  |  |  |
|---|---|---|---|---|---|---|---|
| Liquid dispersion of pigment | Liquid dispersion of magenta pigment (pigment solids content) | 4.0 | 4.0 | 4.0 | 4.0 | 4.0 | 4.0 |
| Resin | Joncryl 631 | 4.0 | 4.0 | 4.0 | 4.0 | 4.0 | 4.0 |
|  | Takelac W-6010 | — | — | — | — | — | — |
| Wax | AQUACER539 | 0.5 | 0.5 | 0.5 | 0.5 | 0.5 | 0.5 |
| Defoamer | Surfynol DF110D | 0.1 | 0.1 | 0.1 | 0.1 | 0.1 | 0.1 |
| Surfactant | BYK348 | 1.0 | 1.0 | 1.0 | 1.0 | 1.0 | 1.0 |
| Purified water |  | Balance | Balance | Balance | Balance | Balance | Balance |
| Total |  | 100.0 | 100.0 | 100.0 | 100.0 | 100.0 | 100.0 |

|  |  | Water-based ink compositions |  |  |  |  |  |
|---|---|---|---|---|---|---|---|
|  |  | Ink G | Ink H | Ink I | Ink J | Ink K | Ink L |
| Extra organic solvents | Propylene glycol | 10.0 | 10.0 | 10.0 | 10.0 | 10.0 | 10.0 |
|  | 2-Pyrrolidone | 15.0 | 15.0 | 15.0 | 15.0 | 15.0 | 15.0 |
| Specified organic solvent | 1,2-Hexanediol | 0.5 | 2.0 | 1.0 | 2.0 | 2.0 | 10.0 |
|  | 3-Methyl-1,5-pentanediol | — | — | — | — | — | — |
|  | Triethylene glycol monobutyl ether |  |  |  |  |  |  |
|  | Diethylene glycol monobutyl ether | — | — | — | — | — | — |
| Liquid dispersion of pigment | Liquid dispersion of magenta pigment (pigment solids content) | 4.0 | 6.0 | 4.0 | 2.0 | 4.0 | 4.0 |
| Resin | Joncryl 631 | 4.0 | 4.0 | 4.0 | 4.0 | — | 4.0 |
|  | Takelac W-6010 | — | — | — | — | 4.0 | — |
| Wax | AQUACER539 | 0.5 | 0.5 | 0.5 | 0.5 | 0.5 | 0.5 |
| Defoamer | Surfynol DF110D | 0.1 | 0.1 | 0.1 | 0.1 | 0.1 | 0.1 |
| Surfactant | BYK348 | 1.0 | 1.0 | 1.0 | 1.0 | 1.0 | 1.0 |
| Purified water |  | Balance | Balance | Balance | Balance | Balance | Balance |
| Total |  | 100.0 | 100.0 | 100.0 | 100.0 | 100.0 | 100.0 |

In the preparation of the inks in Table 1, the following products/ingredients were used.

Extra Organic Solvents
  Propylene glycol (boiling point, 188° C.)
  2-Pyrrolidone (boiling point, 245° C.)
Specified Organic Solvents
  1,2-Hexanediol (boiling point, 223° C.)
  3-Methyl-1,5-pentanediol (boiling point, 250° C.)
  Triethylene glycol monobutyl ether (boiling point, 278° C.)
  Diethylene glycol monobutyl ether (boiling point, 230° C.)
Liquid Dispersion of Pigment
  C.I. Pigment Red 122
Resins
  Joncryl 631 (styrene-acrylic resin, BASF Japan Ltd.)
  Takelac W-6010 (urethane resin, Mitsui Chemicals, Inc.)
Wax
  AQUACER 539 (polyethylene wax, BYK Japan KK)
Defoamer
  Surfynol DF110D (acetylene diol surfactant, Nissin Chemical Industry Co., Ltd.)
Surfactant
  BYK 348 (silicone surfactant, BYK Japan KK)

2. Preparation of Clear Inks

Each clear ink composition in Table 2 was obtained by putting ingredients into a mixing tank according to the formula presented in the table, mixing the ingredients by stirring, and filtering the resulting mixture through a 5-μm membrane filter. In the table, the values for the ingredients of each ink are in % by mass.

TABLE 2

|  |  | Clear ink compositions |  |
|---|---|---|---|
|  |  | Clear A | Clear B |
| Organic solvents | Propylene glycol | 10.0 | 10.0 |
|  | 2-Pyrrolidone | 15.0 | 15.0 |
|  | 1,2-Hexanediol | 2.0 | 2.0 |
| Resin | Joncryl 631 | 4.0 | — |
|  | Takelac W-6010 | — | 4.0 |
| Wax | AQUACER539 | 1.0 | 1.0 |
| Defoamer | Surfynol DF110D | 0.1 | 0.1 |
| Surfactant | BYK348 | 1.0 | 1.0 |
| Purified water |  | Balance | Balance |
| Total |  | 100.0 | 100.0 |

In the preparation of the clear inks in Table 2, the following products/ingredients were used.

Organic Solvents
  Propylene glycol
  2-Pyrrolidone
  1,2-Hexanediol
Resins
  Joncryl 631 (styrene-acrylic resin, BASF Japan Ltd.)
  Takelac W-6010 (urethane resin, Mitsui Chemicals, Inc.)
Wax
  AQUACER 539 (polyethylene wax, BYK Japan KK)
Defoamer
  Surfynol DF110D (acetylene diol surfactant, Nissin Chemical Industry Co., Ltd.)
Surfactant
  BYK 348 (silicone surfactant, BYK Japan KK)

3. Preparation of Treatment Liquids

Each treatment liquid in Table 3 was obtained by putting ingredients into a mixing tank according to the formula presented in the table, mixing the ingredients by stirring, and filtering the resulting mixture through a 5-μm membrane filter. In the table, the values for the ingredients of each treatment liquid are in % by mass.

TABLE 3

|  |  | Treatment liquids | | |
|---|---|---|---|---|
|  |  | Treatment liquid A | Treatment liquid B | Treatment liquid C |
| Organic solvents | Propylene glycol | 10.0 | 10.0 | 10.0 |
|  | 2-Pyrrolidone | 15.0 | 15.0 | 15.0 |
|  | 1,2-Hexanediol | 2.0 | 2.0 | 2.0 |
| Flocculant | Calcium acetate monohydrate | 5.0 | — | — |
|  | Malonic acid | — | 5.0 | — |
|  | Catiomaster PD-7 (solids content) | — | — | 5.0 |
| Defoamer | Surfynol DF110D | 0.1 | 0.1 | 0.1 |
| Surfactant | BYK348 | 2.0 | 2.0 | 2.0 |
| Purified water |  | Balance | Balance | Balance |
| Total |  | 100.0 | 100.0 | 100.0 |

In the preparation of the treatment liquids in Table 3, the following products/ingredients were used.
Organic Solvents
  Propylene glycol
  2-Pyrrolidone
  1,2-Hexanediol
Flocculants
  Calcium acetate monohydrate
  Malonic acid
  Catiomaster PD-7 (cationic resin, Yokkaichi Chemical Co., Ltd.)
Defoamer
  Surfynol DF110D (acetylene diol surfactant, Nissin Chemical Industry Co., Ltd.)
Surfactant
  BYK 348 (silicone surfactant, BYK Japan KK)
4. Ink Jet Recording Media
  M1: BR4907D (fleece wallpaper, embossed; grammage, 147 g/m$^2$)
  M2: MA8942D (fleece wallpaper, not embossed; grammage, 150 g/m$^2$)
  M3: Murakumo Kozo (a kind of Japanese traditional washi paper, not embossed; grammage 42 g/m$^2$)
  M4: MA8301D HEMP (fleece wallpaper, embossed; grammage 160 g/m$^2$)
The "embossed" recording media are available with their entire surface on the recording side embossed. M3 was embossed before testing.
5. Ink Jet Recording Apparatus
The ink jet recording apparatus was a modified version of serial-recording S40650 (Seiko Epson Corporation). A heater for secondary drying, for the drying of ink(s)/liquid on the recording medium, was attached downstream of the ink jet head.

A recording test was performed as follows. The ink jet recording apparatus was loaded with a water-based ink composition and optionally a treatment liquid and/or a clear ink composition, and an image was recorded under the following conditions: recording resolution for the water-based ink composition, 1440×1440 dpi; print pattern, a solid image (single color, magenta); the number of scans for recording with the water-based ink composition, 8; temperature for secondary heating with the heater for secondary heating; 90° C. The type of recording medium, the surface temperature of the recording medium during the print job, and the amount(s) of ink(s)/liquid attached were as in Table 4 or 5. The print temperature and the temperature for secondary heating were determined by measuring the temperature of the recording medium with a thermocouple. In the Examples in which a treatment liquid and/or a clear ink composition were used, patterns were recorded in layers therewith. A pattern with the treatment liquid was recorded first, then an image with the water-based ink composition, and lastly a pattern with the clear ink composition.

6. Testing
6.1. Ink Puddles
In the recording test, a solid-image recording pattern was printed with the parameters for the Example, Comparative Example, or Reference Example as specified in the tables. The printed solid image was visually examined, and image quality was graded according to the grading criteria below. To check for ink puddles, the raised pattern on the recording medium was closely observed. Dark lines of collected ink formed along the undulations of the raised pattern were considered a sign of ink puddles.
Grading Criteria
  AA: There are no puddles of the water-based ink composition. The color of the ink does not look dark anywhere.
  A: Some puddles of the water-based ink composition are observed. The raised pattern partially looks like thin dark lines.
  B: Some puddles of the water-based ink composition are observed. Part of the raised pattern looks like thick dark lines, but to an acceptable extent in terms of print quality.
  C: Puddles of the water-based ink composition are evident. A considerable part of the pattern looks like thick dark lines.

6.2. Wet Abrasion Resistance
The ink jet recording apparatus was loaded with a water-based ink composition and optionally a treatment liquid and/or a clear ink composition, and a solid image was printed on the recording medium under the same conditions as in the recording test. The print parameters were as in Table 4 or 5.

The printed solid image was left at room temperature for 30 minutes, and then the portion of the printed article with the printed solid image thereon was cut into a rectangle measuring 30×150 mm. This sample was immersed in water, and then its recording surface was rubbed 30 times with a piece of plain-woven fabric using a color fastness rubbing tester (load, 500 g). The rubbed surface was visually inspected for ink detachment, and wet abrasion resistance was assessed according to the grading criteria below.
Grading Criteria
  AA: No ink transferred to the piece of fabric, and the ink coating did not peel.
  A: Some ink transferred to the piece of fabric, but the ink coating did not peel.
  B: Some ink transferred to the piece of fabric, and minor peeling of the ink coating is observed.
  C: The ink coating peeled severely, or the substrate itself broke.

6.3. Quality of Solid Image
A solid image was printed on the recording medium under the same conditions as in the recording test. The print parameters were as in Table 4 or 5.

After drying, the quality of the printed solid image was visually examined and assessed according to the grading criteria below. The portion of the recording medium excluding the undulations of the raised pattern was closely observed for bleed unevenness (density irregularities caused by ink bleed) in the solid image.

Grading Criteria

AA: The image has no signs of bleed unevenness.
A: The image has some small signs of bleed unevenness.
B: The image has signs of bleed unevenness, including large ones.
C: The image has a considerable number of large signs of bleed unevenness.

having a raised pattern on its surface. As a result, all Examples achieved effective prevention of ink puddles. The Comparative Examples, which were contrary to the Examples in any of the above conditions, failed to prevent ink puddles effectively. Further details are as follows.

Examples 1 to 4 indicate that among specified organic solvents, C5 or longer alkanediols were superb, for example in wet abrasion resistance and the prevention of ink puddles.

TABLE 4

| | Examples | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Water-based ink composition | Ink A | Ink B | Ink C | Ink D | Ink E | Ink I | Ink J | Ink K | Ink L | Ink A | Ink A | Ink A | Ink A | Ink A |
| Amount of water-based ink composition attached (mg/inch$^2$) | 12.0 | 12.0 | 12.0 | 12.0 | 12.0 | 12.0 | 12.0 | 12.0 | 12.0 | 15.0 | 9.0 | 9.0 | 9.0 | 9.0 |
| Treatment liquid | — | — | — | — | — | — | — | — | — | — | — | Treatment liquid A | Treatment liquid B | Treatment liquid C |
| Amount of treatment liquid attached (mg/inch$^2$) | — | — | — | — | — | — | — | — | — | — | — | 1.0 | 1.0 | 1.0 |
| Recording medium | M1 | M1 | M1 | M1 | M1 | M1 | M1 | M1 | M1 | M1 | M1 | M1 | M1 | M1 |
| Surface temperature of the recording medium (° C.) | 35 | 35 | 35 | 35 | 35 | 35 | 35 | 35 | 35 | 35 | 35 | 35 | 35 | 35 |
| Ink puddles | A | B | B | B | AA | B | AA | A | AA | B | AA | AA | AA | AA |
| Wet abrasion resistance | A | A | B | B | AA | A | A | B | B | B | A | B | B | A |
| Quality of solid image | A | A | A | A | A | A | A | A | A | A | A | AA | AA | AA |

TABLE 5

| | Examples | | | | | | Comparative Examples | | | Reference Examples | | | |
|---|---|---|---|---|---|---|---|---|---|---|---|---|---|
| | 15 | 16 | 17 | 18 | 19 | 20 | 1 | 2 | 3 | 1 | 2 | 3 | 4 |
| Water-based ink composition | Ink A | Ink A | Ink A | Ink A | Ink A | Ink A | Ink F | Ink G | Ink H | Ink A | Ink F | Ink A | Ink F |
| Amount of water-based ink composition attached (mg/inch$^2$) | 9.0 | 9.0 | 9.0 | 9.0 | 12.0 | 12.0 | 12.0 | 12.0 | 12.0 | 12.0 | 12.0 | 12.0 | 12.0 |
| Treatment liquid | Treatment liquid A | Treatment liquid A | — | — | — | — | — | — | — | — | — | — | — |
| Amount of treatment liquid attached (mg/inch$^2$) | 0.5 | 1.0 | — | — | — | — | — | — | — | — | — | — | — |
| Clear ink composition | — | Clear A | Clear A | Clear B | — | — | — | — | — | — | — | — | — |
| Amount of clear ink composition attached (mg/inch$^2$) | — | 1.0 | 1.0 | 1.0 | — | — | — | — | — | — | — | — | — |
| Recording medium | M1 | M1 | M1 | M1 | M1 | M4 | M1 | M1 | M1 | M3 | M3 | M2 | M2 |
| Surface temperature of the recording medium (° C.) | 35 | 35 | 35 | 35 | 40 | 35 | 35 | 35 | 35 | 35 | 35 | 35 | 35 |
| Ink puddles | AA | AA | B | B | B | AA | C | C | C | AA | AA | AA | AA |
| Wet abrasion resistance | A | A | AA | A | B | AA | B | B | C | C | C | AA | A |
| Quality of solid image | A | AA | A | A | AA | A | B | B | B | AA | AA | A | A |

7. Test Results

Tables 4 and 5 summarize the water-based ink composition used, the treatment liquid and/or clear ink composition optionally used, recording parameters, and test results for each Example, Comparative Example, or Reference Example.

In the Examples, the water-based ink composition contained a specified organic solvent as described above and a pigment, with their respective percentages being 1.0% by mass or more and not more than 5.0% by mass, and was used to perform recording on a synthetic fiber-containing sheet Examples 1, 5, 6, and 9 indicate that increasing the percentage of the specified organic solvent led to, for example, more effective prevention of ink puddles. Wet abrasion resistance was stronger with lower percentage of the specified organic solvent.

Examples 1 and 7 indicate with ink puddles were prevented more effectively with lower pigment content of the ink.

Examples 1, 10, and 11 indicate that ink puddles become less common with reduced amount of ink attached. The second aspect of the present disclosure, however, helps achieve effective prevention of ink puddles even when the amount of ink attached is somewhat large. One can therefore produce useful printed articles by recording, for example on wallpaper, with this aspect of the disclosure.

When Example 11 is compared with Examples 12 to 15, furthermore, it is seen that using a treatment liquid further improves the quality of a solid image.

When Example 11 is compared with Examples 17 and 18, it is seen that using a clear ink composition further improves wet abrasion resistance.

Comparative Examples 1 and 2 indicate that ink puddles were not effectively prevented when the ink contained no specified organic solvent or contained one but with its percentage being less than 1.0% by mass.

Comparative Example 3 indicates that with a water-based ink composition containing more than 5.0% by mass pigment, ink puddles were not effectively prevented.

In Reference Examples 3 and 4, in which the recording medium had no raised pattern on its surface, the problem of ink puddles did not occur despite the use of a sheet containing a synthetic fiber. Due to the lack of a raised pattern on the surface of the recording medium, however, the resulting recording was not so aesthetically attractive.

Reference Examples 1 and 2, in which the recording medium was not a synthetic fiber-containing sheet, no ink puddles formed despite the presence of a raised pattern on the surface of the recording medium. The resulting recording, however, was poor in wet abrasion resistance.

The study also included a sheet of PVC wallpaper having a raised pattern, but this sheet was found unsuitable because it was difficult to attach it to a wall with a water-based adhesive agent. On this type of recording medium, moreover, the severity of ink puddles was not improved or worsened by adding a specified organic solvent to the water-based ink composition or changing its percentage as in the Examples. Advantages as in the Examples were not observed.

Although not presented in the tables, the recording job in Example 1 was repeated with an increased number of scans of 12, leading to more effective prevention of ink puddles and improved quality of a solid image. The prevention of ink puddles and the quality of a solid image were better with increasing number of scans.

The present disclosure is not limited to the above embodiments, and many variations are possible. For example, the present disclosure embraces configurations substantially identical to those described in the embodiments (e.g., configurations identical in function, methodology, and results to or having the same goal and offering the same advantages as the described ones). The present disclosure also includes configurations created by changing any nonessential part of those described in the above embodiments. Furthermore, the present disclosure encompasses configurations identical in operation and effect to or capable of fulfilling the same purposes as those described in the above embodiments. Configurations obtained by adding any known technology to those described in the embodiments are also part of the present disclosure.

What is claimed is:

1. An ink jet recording method performed using an ink jet recording apparatus, the method comprising:
    a treatment liquid attachment step, in which a treatment liquid containing a flocculant is attached to a recording medium; and
    an ink attachment step, in which a water-based ink composition containing a colorant is ejected from an ink jet head and attached to the recording medium, wherein:
    the ink jet recording apparatus includes:
        a recording medium support, which supports the recording medium; and
        a heating mechanism that heats the recording medium support;
    the ink attachment step is carried out with the recording medium supported and heated by the recording medium support;
    in the ink attachment step, the recording medium is heated so that a surface thereof reaches a maximum temperature of 28.0° C. or more and 45.0° C. or less where the recording medium is supported by the recording medium support and faces the ink jet head;
    a ratio A/B between absorbances A and B is 0.5 or more and 0.95 or less, where absorbance A is an absorbance of a 0.1% by mass mixture of the water-based ink composition in the treatment liquid at a peak wavelength, and absorbance B is an absorbance of a 0.1% by mass mixture of the water-based ink composition in purified water at the same wavelength; and
    the recording medium support has a flat support surface for supporting the recording medium.

2. The ink jet recording method according to claim 1, wherein
    the ink attachment step is by making a plurality of main scans and sub-scans the recording medium.

3. The ink jet recording method according to claim 1, wherein
    in the ink attachment step, in-plane variations in a surface temperature of the recording medium are 8.0° C. or less where the recording medium is supported by the recording medium support and facing the ink jet head.

4. The ink jet recording method according to claim 1, wherein
    the heating mechanism heats the recording medium support from a side opposite the support surface.

5. The ink jet recording method according to claim 1, wherein
    the water-based ink composition has an average zeta potential of −65.0 mV or more and −50.0 mV or less.

6. The ink jet recording method according to claim 1, wherein
    the recording medium measures 0.5 m or more in a direction perpendicular to a direction of transport thereof.

7. The ink jet recording method according to claim 1, wherein
    the recording medium support measures longer than the recording medium in a direction perpendicular to a direction of transport of the recording medium.

8. The ink jet recording method according to claim 1, wherein
    the support surface of the recording medium support is formed by an element having a thickness of 2.0 mm or more and 10.0 mm or less.

9. The ink jet recording method according to claim 1, wherein
    the ink attachment step includes an air-blow step, in which air is blown using an air-blow mechanism against the recording medium having the attached water-based ink composition thereon.

10. The ink jet recording method according to claim 9, wherein
the air is blown against the recording medium at a velocity of 1.0 m/sec or more.

11. The ink jet recording method according to claim 9, wherein
the air blown against the recording medium has a temperature of 45.0° C. or less.

12. The ink jet recording method according to claim 1, wherein
the ratio A/B is 0.7 or more and 0.9 or less.

13. The ink jet recording method according to claim 1, wherein
the recording medium has a thickness of 40.0 μm or more.

14. The ink jet recording method according to claim 1, wherein
a percentage of organic solvents having a normal boiling point exceeding 280.0° C. in the water-based ink composition is not more than 1.0% by mass.

15. The ink jet recording method according to claim 1, wherein
the support surface touches the recording medium in 90.0% or more by area of a portion thereof where the support surface supports the recording medium and faces the ink jet head.

16. A recording apparatus configured to perform the ink jet recording method according to claim 1.

* * * * *